United States Patent [19]
Perkowski

[11] Patent Number: 6,064,979
[45] Date of Patent: *May 16, 2000

[54] METHOD OF AND SYSTEM FOR FINDING AND SERVING CONSUMER PRODUCT RELATED INFORMATION OVER THE INTERNET USING MANUFACTURER IDENTIFICATION NUMBERS

[75] Inventor: Thomas J. Perkowski, Darien, Conn.

[73] Assignee: IPF, Inc., Darien, Conn.

[ * ] Notice: This patent is subject to a terminal disclaimer.

[21] Appl. No.: 08/752,136

[22] Filed: Nov. 19, 1996

Related U.S. Application Data

[63] Continuation-in-part of application No. 08/736,798, Oct. 25, 1996, Pat. No. 5,918,214.

[51] Int. Cl.$^7$ ............................................. G06F 17/60
[52] U.S. Cl. ...................... 705/26; 235/375; 378/93.12; 709/219; 705/27
[58] Field of Search ................................. 705/1, 14, 16, 705/21, 22, 24, 26, 27; 707/1, 2, 3, 4, 10, 101, 104, 501, 513; 395/200.3, 200.31, 200.33, 200.47, 200.48, 200.49; 235/375, 376, 462; 329/93.12; 709/219

[56] References Cited

U.S. PATENT DOCUMENTS

| | | | |
|---|---|---|---|
| 4,654,482 | 3/1987 | DeAngelis | 379/93.12 |
| 5,288,976 | 2/1994 | Citron et al. | 235/375 |
| 5,592,378 | 1/1997 | Cameron et al. | 705/27 |
| 5,612,527 | 3/1997 | Ovadia | 235/383 |
| 5,635,694 | 6/1997 | Tuhro | 235/375 |
| 5,640,193 | 6/1997 | Wellner | 348/7 |
| 5,715,444 | 2/1998 | Danish et al. | 707/4 |
| 5,804,803 | 9/1998 | Cragun et al. | 235/375 |

FOREIGN PATENT DOCUMENTS

| | | | |
|---|---|---|---|
| 0 744 856 A2 | 11/1996 | European Pat. Off. | H04M 3/42 |
| 0 837 406 A2 | 4/1998 | European Pat. Off. | G06F 17/30 |
| WO 97/01137 | 1/1997 | WIPO | G06F 3/06 |
| WO 97/37319 | 10/1997 | WIPO | G06K 7/10 |
| WO 97/38389 | 10/1997 | WIPO | G06F 5/01 |
| WO 98/06055 | 2/1998 | WIPO | G06F 63/00 |
| WO 98/09243 | 3/1998 | WIPO | G06F 19/00 |
| WO 98/20411 | 5/1998 | WIPO | G06F 3/00 |

*Primary Examiner*—Stephens R. Tkacs
*Attorney, Agent, or Firm*—Thomas J. Perkowski, Esq., P.C.

[57] ABSTRACT

A method of and system for finding and serving consumer product-related information on the Internet comprising a database serving subsystem which stores: a plurality of manufacturer identification numbers (MINs) assigned to a plurality of manufacturers of consumer products; a plurality of home-page specifying URLs symbolically linked to the plurality of MINs; a plurality of universal product numbers (UPN) assigned to a plurality of consumer products made by the plurality of manufacturers; and a plurality of product-information specifying URLs symbolically linked to the plurality of UPNs. During operation, a client subsystem transmits to the database serving subsystem, a request for information which includes the UPN assigned to the consumer product on which product-related information is being sought. The database serving subsystem automatically compares the UPN against the stored plurality of MINs, and automatically returns to the client subsystem, one or more of URLs symbolically linked to the UPN, if URLs have been symbolically linked to the UPN within the database serving subsystem. However, if no URLs have been symbolically linked to the UPN, then the database serving subsystem automatically returns the home-page specifying URL symbolically linked to the MIN contained within the UPN in the request. By virtue of this novel MIN-based search mechanism embodied within the database serving subsystem, client subsystems are automatically provided with the home-page of the manufacturer's World Wide Web (WWW) site in situations where product-information specifying URLs have not yet been symbolically linked with the UPN on any one of the manufacturer's products.

27 Claims, 12 Drawing Sheets

| IP/SN | REGISTRANT'S NAME | PRODUCT DESCRIPTION | UNIFORM RESOURCE LOCATOR (URL) | TRADE/ SERVICE MARKS | e-mail Address | Status |
|---|---|---|---|---|---|---|
| 7/18908/17674/0 | APPLE COMPUTER, INC. CUPERTINO, CALIF. | POWER MAC. 7600/120 PERSONAL COMPUTER | http://www.power./pc | POWER MAC. | | |
| 0/373/100/6 | PROCTOR & GAMBLE | TOOTH PASTE | http://www.tooth.p./pc | CREST | | |
| 3/12547/68404/0 | WARNER WELCOME | ACID REDUCER | http://www.zantac./pc | ZANTAC, ZANTAC 75 | | |
| 0/00005/17643/4 | KODAK, INC. | FILM PROCESSING | http://www.kodak./pc | KODAK | | |
| ... | ... | ... | ... | ... | ... | ... |
| 0/27242/51057/9 | SONY, INC. | PERSONAL COMPUTER | http://www.sony.com./pc | SONY | | |

F I G. 2A1

| URL$_j$ | PRODUCT SPECIFICATION INFORMATION FIELD | PRODUCT UPDATE INFORMATION FIELD | PRODUCT WARRANTY / SERVING INFORMATION FIELD | PRODUCT INCENTIVE INFORMATION FIELD | PRODUCT REVIEW INFORMATION FIELD | MISCELLANEOUS INFORMATION FIELD | PRODUCT ADVERTISEMENT INFORMATION FIELD |
|---|---|---|---|---|---|---|---|
| | | | | | | | |
| | | | | | | | |
| | | | | | | | |
| ... | ... | ... | ... | ... | ... | ... | ... |
| | | | | | | | |

FIG. 2A2

| IP/SN | REGISTRANT'S NAME | PRODUCT DESCRIPTION | TRADE/SERVICE MARKS | E-MAIL ADDRESS | STATUS |
|---|---|---|---|---|---|
| 7/05089/37460/7 | NETSCAPE COMMUNICATIONS CORP. | INTERNET NAVIGATOR | NETSCAPE, NAVIGATOR | | |
| 0/30000/01020/4 | QUAKER, INC. | OATMEAL | QUAKER | | |
| 0/496/390/1 | COLA COLA, INC. | COLA SODA | COCA - COLA, COKE | | |
| 0/7599/24245/2 | WARNER BROS. | PAT METHANY AUDIO CD | GEFFEN | | |
| ... | ... | ... | ... | ... | ... |

FIG. 2B

METHOD OF AND SYSTEM FOR FINDING AND SERVING CONSUMER PRODUCT RELATED INFORMATION OVER THE INTERNET USING MANUFACTURER IDENTIFICATION NUMBERS

RELATED CASES

This is a Continuation-in-Part of application Ser. No. 08/736,798 entitled "System And Method For Finding Product And Service Related Information On The Internet" filed by Thomas J. Perkowski on Oct. 25, 1996, now U.S. Pat. No. 5,918,214, and incorporated herein by reference in its entirety.

BACKGROUND OF INVENTION

1. Field of Invention

The present invention relates to a system and method for finding product and service related information on the International Information Infrastructure (e.g. the Internet).

2. Brief Description of the Prior Art

Presently, an enormous amount of time, money and effort is being expended by companies in order to advertise and sell their products and services, and post-purchase product-related information, warranty service and the like. For decades, various types of media have been used to realize such fundamental business functions.

In recent times, there has been a number of significant developments in connection with the global information network called the "Internet", which has greatly influenced many companies to create multi-media Internet Web-sites in order to advertise, sell and maintain their products and services. Examples of such developments include, for example: the Hypertext Markup Language (HTML) based World Wide Web (WWW) by Tim Berners-Lee; user friendly GUI-based Internet navigation tools, such as the Netscape® browser from Netscape Communications, Inc., the Internet Explorer™ browser from MicroSoft Corporation and the Mosaic™ browser from Spyglass Corporation; and the Virtual Reality Modelling Language (VRML) by Mark Pecse. Such recent developments have made it very easy for businesses to create 2-D Hypermedia-based Home Pages and 3-D VR Worlds (i.e. 3-D Web-sites) for the purpose of projecting a desired "corporate image" and providing a backdrop for financial investment solicitation, product and service advertisement, sales and maintenance operations.

Presently, a person desiring to acquire information about any particular product has numerous of available search options. In particular, he or she may attempt to directly contact the manufacturer, wholesaler or reseller via telephone, US mail, e-mail, or the company's World Wide Web-site (WWW), if such a one exists. In order to acquire product information through the seller's WWW site, the inquirer must first determine the location of its WWW site (i.e. Internet address) which oftentimes can involve using Internet Search engines such as Yahoo®, AltaVista™, WebCrawler™, Lycos™, Excite™, or the like. This can be a very time consuming process and may lead to a dead end. Upon obtaining the Internet address one must then review the home page of the company's Web-site in order to find where, if at all, information about a particular product resides on the Website. This search process can be time consuming and therefore expensive (in terms of Internet time) and may not locate the desired information on the product of interest.

In some instances, product brochures bear a preprinted Internet address designed to direct or point prospective customers to a particular Web-site where more detailed product information can be found. A recent example of this "preprinted Web Address" pointing technique is the 1996 product brochure published by the Sony Corporation for its Sony® PCV-70 Personal Computer, which refers prospective customers to the Sony Web Address "http://www.sony.com/pc". While this approach provides a direct way of finding product and service related information on the Internet, it is not without its shortcomings and drawbacks.

In particular, when a company improves, changes or modifies an existing Web-site which publishes product and/or service advertisements and related information, it is difficult (if not impossible) not to change the Internet locations (i.e. Web addresses) at which such product and/or service advertisements and related information appear. Whenever a company decides or is forced to change any of its advertising, marketing and/or public relations firms, there is a substantial likelihood that new Web-sites will be created and launched for particular products and services, and that the Web addresses of such new Web-sites will no longer correspond with the Web addresses on preprinted product and service brochures in currently in circulation. This can result in pointing a consumer to erroneous or vacant Web-sites, which present either old or otherwise outdated product and/or service information, and thereby possibly adversely influencing the consumer's purchasing decision.

Moreover, when a company launches a new Web-site as part of a new advertising and marketing campaign for a particular product or service, any preprinted advertising or marketing material relating to such products and services will not reflect the new Web-site addresses which the campaign is promoting for consumer visitation. This fact about preprinted advertising media renders it difficult to unify new and old advertising media currently in circulation into thematically coherent advertising and marketing campaign. In short, the inherently static nature of the "preprinted Web address" pointing technique described above is wholly incapable of adjusting to the dynamic needs of advertising, marketing and public relations firms alike.

In addition to the above-described techniques, I-World by Mecklermedia has recently launched a commercial product finder database on the Internet called "Internet Shopper". Notably, the "Internet Shopper" database is organized by specific types of product categories covering computer and telecommunication related technologies. While this product information finding service may be helpful to potential consumers of computer or communication equipment, nevertheless it fails to provide an easy way to find information on previously purchased products, or on products outside of the field of communication or computer technology. Consequently, the value of this prior art technique is limited to those considering the purchase of products catalogued within the taxonomy of the "Internet Shopper" directory.

In view of the inherent limitations of I-World's "Internet Shopper" and other product finding directories on the Internet, such as "NetBuyer" by Computer Shopper (at "http://www.netbuyer.com"), the National Information Infrastructure Testbed (NIIT) organization has recently formed a "confidential committee of NIIT members" under the title "Universal Product and Service Code Project". The stated problem addressed by this Project is to determine how to locate specific goods and services on the Internet, and how to compare prices and other critical market information. As publicized in a NIIT Project Abstract, the "Universal Product and Service Code Project seeks to make it easier to electronically locate goods and services on the Internet using universal product and service identifiers and locators. As stated in the Project Abstract, the "NIIT believes that changing the way in which Internet information is organized is fundamental to solving this problem. In the Universal Product and Service Code Project, NIIT members are currently exploring how coding structures can help organize information about products and services accessible using the Internet. NIIT's goal is to inform the development of formalized coding standards that can be used nationally and internationally so that users can locate goods and services through simple searching and browsing methods. In turn, more advanced features, such as comparison shopping, can be added as "intelligent agent" software programs are refined to enable users to search and retrieve products and services linked to these structures.

While the NIIT's Universal Product and Service Code Project seeks ways of locating specific goods and services on the Internet, all proposals therefor recommend the development of formalized coding standards and searching and browsing methods which are expensive and difficult to develop and implement on a world-wide basis. Moreover, such sought after methods will be virtually useless to consumers who have already purchased products and/or services and now seek product and/or service related information on the Internet.

Thus, it is clear that there is great need in the art for a system and method for finding commercial product and service information on the Internet, in a way which avoids the shortcomings and drawbacks of prior art systems, proposals, and methodologies.

OBJECTS AND SUMMARY OF INVENTION

Accordingly, a primary object of the present invention is to provide a novel system and method for finding product and service related information on the Internet, while avoiding the shortcomings and drawbacks of prior art systems and methodologies.

Another object of the present invention is to provide such a system and method, which will accelerate the acceptance of the electronic marketplace on the Internet, particularly by consumers and small businesses alike.

Another object of the present invention is to provide such a system and method, wherein virtually any type of product or service can be registered with the system by symbolically linking or relating (i) its preassigned Universal Product or Service Number (e.g. UPC number) or at least the Manufacture Identification Number (MIN) portion thereof with (ii) the Uniform Resource Locators (URLs) of one or more information resources on the Internet (e.g. the home page of the manufacturer's Web-site) related to such products or services.

Another object of the present invention is to provide such a system and method with an improved Internet browser or Internet application tool having both an "Internet Product/Service Information (IPSI) Finder" button for entering the "IPSI Finder Mode" of the system when it is selected, and also a "Universal Product/Service Number (UPSN) Search" button for entering the "UPSN Search Mode" when the "UPSN Search" button is selected.

Another object of the present invention is to provide such a system, wherein when the system is in its IPSI Finder Mode, a predesignated information resource (e.g. advertisement, product information, etc.) pertaining to any commercial product or service registered with the system can be automatically accessed from the Internet and displayed from the Internet browser by simply entering the registered product's UPN or the registered service's USN into the Internet browser.

Another object of the present invention is to provide such a system, wherein during the "UPSN Search Mode" of the system, a predesignated information resource (e.g. advertisement, product information, etc.) pertaining to any commercial product or service registered with the system can be automatically accessed from the Internet and displayed from the Internet browser by simply entering the registered product's trademark(s) and/or associated company name into the Internet browser.

Another object of the present invention is to provide such a system, wherein a predesignated information resource pertaining to any commercial product or service having been assigned a Universal Product Number (UPN) or Universal Service Number (USN) can be accessed from the Internet and displayed from the Internet browser by simply selecting its IPSI Finder button and then entering the UPN or USN numeric string into a dialogue box which pops up on the display screen of the Internet browser program.

Another object of the present invention is to provide such a system in which a relational database, referred to as "an Internet Product and Service Directory (IPSD)," is realized on one or more data-synchronized IPSD Servers for the purpose of registering product and service related information, namely: (i) information representative of commercial product descriptions, the trademarks used in connection therewith, the company names providing and/or promoting such products, the e-mail addresses of such companies, and the corresponding URLs on the Internet specifying current (i.e. up-to-date) Internet Web-site locations providing product-related information customized to such products; and (ii) information representative of commercial service descriptions, the servicemarks used in connection therewith, the company names providing and/or promoting such services, the E-mail addresses of such companies, and the corresponding URLs on the Internet specifying current (i.e. up-to-date) Internet Web-site locations providing service-related information customized to such services.

Another object of the present invention is to provide such a product information finding system, wherein the URLs symbolically linked to each registered product in the IPSD Servers thereof are categorized as primarily relating to Product Advertisements, Product Specifications, Product Updates, Product Distributors, Product Warranty/Servicing, and/or Product Incentives (e.g. rebates, discounts and/or coupons), and that such URL categories are graphically displayed to the requester by way of easy-to-read display screens during URL selection and Web-site connection.

Another object of the present invention is to provide a novel method of carrying out electronic-type commercial transactions involving the purchase of products and services which are advertised on the Internet at uniform resource locations (URLs) registered with the IPSI system of the present invention.

Another object of the present invention is to provide a novel system and method of finding the UPN or USN associated with any particular registered product or service, respectively, by simply selecting a GUI button on the Internet browser display screen in order to enter a "UPSN Search Mode", whereby (i) a dialogue box is displayed on the display screen requesting any known trademarks associated with the product, and/or the name of the company that makes, sells or distributes the particular product, and (ii) the corresponding UPN (i.e., UPC number or EPC number) registered with the IPSD Servers is displayed to the user for acceptance, whereupon the Internet information resource locators (URLs) are automatically accessed from the IPSD Servers and displayed on the display screen of the Internet browser for subsequent URL selection and Web-site connection.

Another object of the present invention is to provide such a system and method, wherein during the UPSN Search Mode, the UPN (e.g. UPC number) associated with any registered product can be found within the database of the IPSD Server using any trademark(s) and/or the company name commonly associated with the product, and the USN number associated with any registered service can be found within the database of the IPSD Server using any servicemark(s) and/or the company name commonly associated with the service.

Another object of the present invention is to provide such a system and method in the form of an electronic kiosk installed within a store and having an automatic projection-type, laser scanning bar code symbol reader for reading the UPC numbers on products being offered for sale in the store, and also a video display screen for displaying product-related information accessed from hyper-linked Web-sites on the Internet.

Another object of the present invention is to provide a novel method of constructing a relational database for use within the product and service information finding system of the present invention.

Another method of the present invention is to provide such a method of database construction, wherein the relational database is initially "seeded" with (i) the six digit UPC Manufacturer Identification Numbers (MIN) incorporated into the first six characters of each UPC number applied to the products thereof and (ii) the URLs of the Web-site home pages of such manufacturers, and is subsequently extended and refined with the participation of each registered manufacturer (and/or product distributor) by adding to the database (iii) the 12 digit UPC numbers assigned to each product sold thereby and (iv) the URLs symbolically linked to each such corresponding product.

Another object of the present invention is to provide such a system and method, in which Web-site-based advertising campaigns can be changed, modified and/or transformed in virtually any way imaginable by simply restructuring the symbolic links between the products and/or services in the campaign using current (i.e. up-to-date) Web-site addresses at which Web-site advertisements and information sources related thereto are located on the Internet.

Another object of the present invention is to provide a novel system and method of automatically soliciting companies to register their products and services within the databases of such IPSD Servers in order that product and service related information of a multimedia nature (e.g. Web-sites), once registered therewith, can be easily found on the Internet by any potential consumer using the system and method of the present invention.

These and other objects of the present invention will become apparent hereinafter and in the claims to Invention.

BRIEF DESCRIPTION OF THE DRAWINGS

For a more complete understanding of how to practice the Objects of the Present Invention, the following Detailed Description of the Illustrative Embodiments should be read in conjunction with the accompanying Drawings, wherein:

FIG. 2A1 is a schematic representation of the relational-type IPSI Registrant Database maintained by each IPSD Server that is configured into the IPSI finding system of the illustrative embodiment of the present invention, showing the information fields for storing (i) the information elements representative of the UPN (e.g. UPC numeric data structure, National Drug Code (NDC) numeric data structure, and/or European Product Code (EPC) alpha-numeric data structure), URLs, trademark(s) ($TM_i$), Company Name ($CN_i$), Product Description ($PD_i$) and E-mail Address ($EMA_i$) thereof symbolically-linked (i.e. related) for a number of exemplary IPSI Registrants listed (i.e. registered) with the IPSI Registrant Database maintained by each IPSD Server, and (ii) the information elements representative of the UPN (e.g. UPC numeric data structure, National Drug Code (NDC) numeric data structure, and/or European Product Code (EPC) alphanumeric data structure), URLs, Servicemark(s) ($SM_j$), Company Name ($CN_j$), Service Description ($SD_j$) and E-mail Address ($EMA_j$) thereof symbolically-linked for a number of exemplary IPSI Registrants registered with the IPSI Registrant Database maintained by each IPSD Server;

FIG. 2A2 is a schematic representation of the information subfield structure of the URL Information Field of the IPSD Database of FIG. 2A1, showing the Product Advertisement Information Field, the Product Specification (Description) Information Field, the Product Update Information Field, the Product Distributor Information Field, the Product Warranty/Servicing Information Field, the Product Incentive Information Field thereof, the Product Review Information Field, and Miscellaneous Information Field;

FIG. 2B is a schematic representation of the relational-type Non-IPSI Registrant Database maintained by each IPSD Server that is configured into the IPSI finding system of the illustrative embodiment of the present invention, showing the information fields for storing (i) the information elements representative of the Company Name ($CN_i$), Trademark(s) ($TM_i$) registered by the associated Company, and E-Mail Address ($EMA_i$) thereof symbolically-linked for a number of exemplary Non-IPSI registrants listed within the Non-IPSI Registrant Database maintained by each IPSD Server, and (ii) the information elements representative of the Company Name ($CN_i$), Servicemark(s) ($SM_i$) registered by the associated Company, and E-Mail Address ($EMA_i$) thereof symbolically-linked for a number of exemplary Non-IPSI registrants listed within the Non-IPSI Registrant Database maintained by each ISPD Server;

DETAILED DESCRIPTION OF THE ILLUSTRATIVE EMBODIMENTS OF THE PRESENT INVENTION

Figure 1:
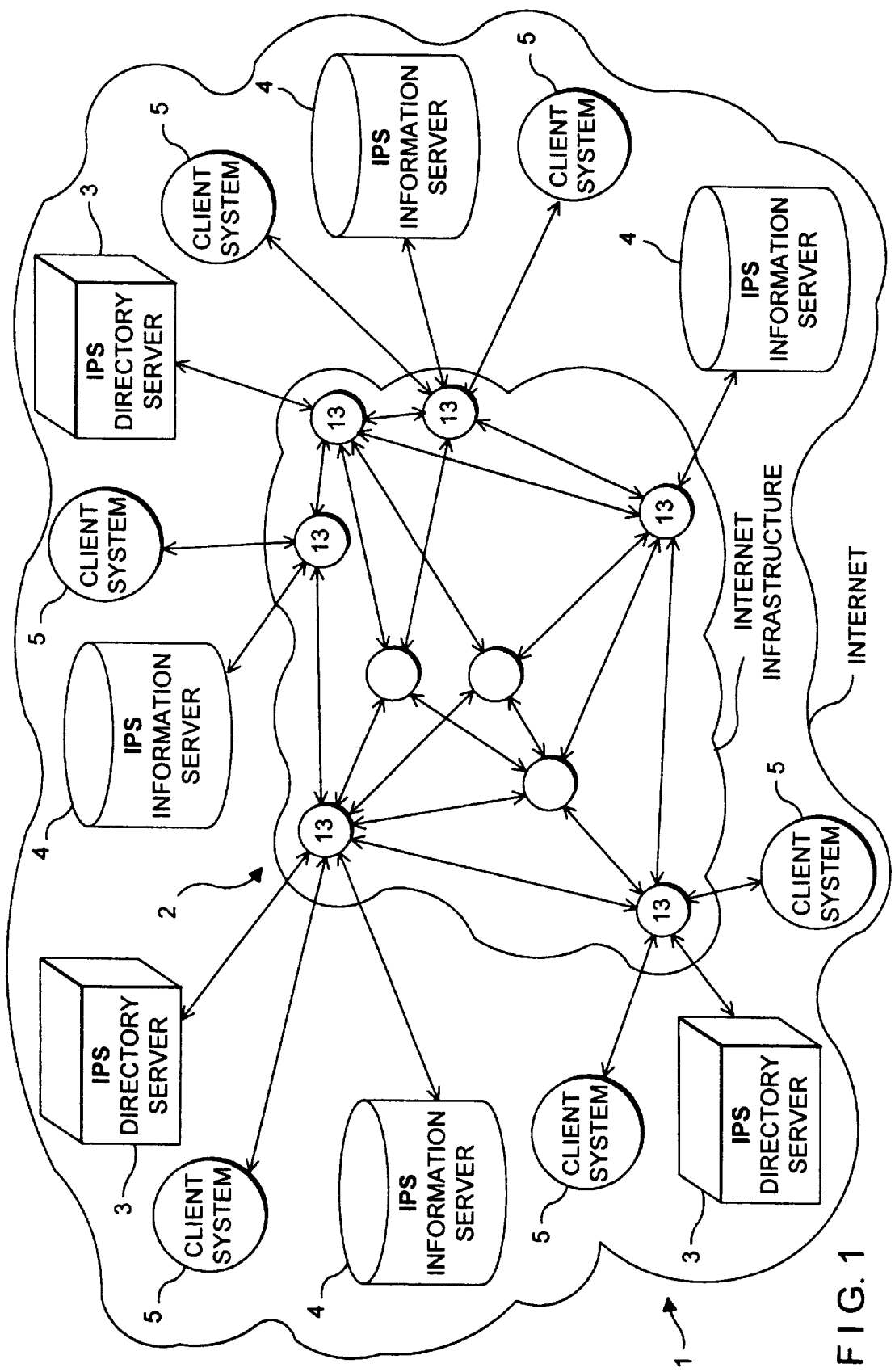
FIG. 1 is a schematic diagram of a first illustrative embodiment of the product and service information finding system of the present invention shown embedded with the infrastructure of the global computer communications network known as the "Internet", and comprising a plurality of data-synchronized Internet Product and Service Directory (IPSD) Servers connected to the infrastructure of the Internet, a plurality of Internet Product and Service Information (IPSI) Servers connected to the infrastructure of the Internet, and a plurality of Client Systems connected to the infrastructure of the Internet.

Referring to the figures shown in the accompanying Drawings, like structures and elements shown throughout the figures thereof shall be indicated with like reference numerals.

Overview Of The Internet Product And Service Information (IPSI) Finding System Hereof As shown in FIG. 1, the product/service information finding system of the present invention is generally indicated by reference numeral 1 and comprises an arrangement of system components, namely: a globally-based digital telecommunications network (such as the Internet) 2 having an infrastructure (including Internet Service Providers (ISPs), Network Service Providers (NSPs), routers, telecommunication lines, channels, etc.) for supporting packet-switched type digital data telecommunications using the TCP/IP networking protocol well known in the art; one or more Internet Product and Service Directory (IPSD) Servers, each indicated by reference numeral 3 and being connected to the Internet at strategically different locations via the Internet infrastructure and data-synchronized with each other in order that each such Server maintains mirrored a database structure as represented in FIGS. 2A1 through 2B; a plurality of Internet Product and Service Information (IPSI) Servers, each indicated by reference numeral 4 and being connected to the Internet via the Internet infrastructure; and a plurality of User (or Client) Computers, each indicated by reference numeral 5 and being connected to the Internet via the Internet infrastructure.

In a first illustrative embodiment of the system shown in FIG. 1, each Client Computer 5 has an GUI-based Internet browser program (e.g. Netscape, Internet Explorer, Mosaic, etc.) which has been provided with a suitable plug-in type module constructed in such as way to provide the functionalities of the present invention. An exemplary display screen produced by the GUI-based web browser program is set forth in FIG. 1A. As shown, the GUI-based web browser program provides an onscreen IPSI Finder Button 8 and an on-screen US/PN Search Button 9 for carrying out the IPSI finding method of the present invention. The details of these functions will be described hereinafter.

In an alternative embodiment of the system shown in FIG. 1, each Client Computer has a conventional GUI-based web browser program (e.g. Netscape, Internet Explorer, Mosaic, etc.) with a plug-in type module, such as CyberFinder™ navigational software by Aladdin Systems, Inc., of Watsonville, Calif., that provides an on-screen graphical icon for a "IPSI Web-site Finder" function. An exemplary display screen 10 produced by such a GUI-based web browser program is set forth in FIG. 1B. As shown, the on-screen IPSI Web-site Finder icon functions as an "IPSI Web-site Finder" Button 11 for instantly connecting the Client System to the IPSI Web-site (i.e., on each IPSD Server) and carrying out the Internet Product and Service Information (IPSI) finding method of the present invention. Upon selecting this button (e.g. by a clicking of the mouse), the user is automatically connected to the IPSI Web-site (supported on each IPSD Server), at whose "home page" appears the IPSI Finder and UPSN Search buttons described above appear and functionalities represented thereby. The URL for the home page of the IPSI Web-site should be selected with marketing considerations in mind, for example, "http://www.ipf.com" or "http://www.ipsi.com" similar in form with the URLs of other information search-engines and directories currently available on the Internet. Alternatively, the URL of the home page of the PSI Web-site can be recorded as a browser "bookmark" for easy recall and access through a conventional GUI-based Internet browser. Once at the home page of the IPSI Web-site, an Internet user can find product and service related information on the Internet in essentially the same way as when using the web browser program of FIG. 1A.

In the illustrative embodiment, each synchronized IPSD Server 3 can be realized by, for example, the PowerMac® Internet Server from Apple Computer, Inc. or any other suitable computing machine that can perform the function of a Server in a web-based, client-server type computer system architecture of the illustrative embodiment. As shown in FIG. 1, each IPSD Server is interfaced with an ISP 13 in a conventional manner. The actual number of IPSD Servers used in any particular application will depend on various factors including, for example, user demand, Internet traffic conditions, network router capacity and performance, etc. Each such IPSD Server is assigned a static TCP/IP address and a unique domain name on the Internet. Each IPSD Server is also provided with (i) Internet networking software to support the TCP/IP networking protocol, (ii) an Application Programming Interface (API) for Web-site and application program development and (iii) Web-site server software for creating and maintaining the IPSI Registrant Database and the Non-IPSI Registrant Database schematically illustrated in FIGS. 2A and 2B, respectively. Such databases can be expressed in the 4th Dimension® SQL Language, the Sybase language, or any other suitable database language which allows for database programming and database connectivity over the Internet. A suitable development program for creating a dynamic Web-site with the integrated database structures of FIGS. 2A1, 2A2 and 2B is the "4D Web SmartServer" from ACI, Inc. Data synchronization among such databases can be achieved using conventional data synchronization techniques well known in the art. In addition, a backup and mirroring program can be used to maintain data security. Preferably, the synchronized IPSD Servers are maintained by a team of network managers under the supervision of one or more webmasters.

Similarly, each IPSI Server 4 can be realized by, for example, the PowerMac® Internet Server from Apple Computer, Inc., or any other computing machine that can perform the function of a Server in a web-based, client-server type computer system architecture of the illustrative embodiment. As shown in FIG. 1, each IPSI Server is interfaced with an ISP 13 in a conventional manner. Each such IPSI Server is assigned a static TCP/IP address and a unique domain name on the Internet. Each IPSI Server is also provided with (i) Internet networking software to support the TCP/IP networking protocol, (ii) an Application Programming Interface (API) for application program development and (iii) Web-site server software for creating and maintaining hypermedia-type Web-sites containing product and/or service related information of a multi-media nature. Such Web-sites can be expressed in HTML and/or VRML or any other suitable language which allows for Web-site construction and Web-site connectivity. Web-site management software, such as Adobe® SiteMill™, should be used to maintain correct hyper-links for any particular Web-site. Preferably, the IPSI Servers are maintained by a team of network managers under supervision of one or more webmasters.

Each User (i.e. Client) Computer 5 can be realized by any computing system employing operating system (OS) software (e.g. Macintosh, Windows, Unix etc.) which supports an Internet browser program (e.g. Netscape, Internet Explorer, Mosaic, etc.) which includes Internet networking software that supports the TCP/IP networking protocol, and provides a GUI-based Web browser interface. Alternatively, Client Systems may also be realized by any of the following systems: (i) a Newton MessagePad 130 (running the Newton 2.0 Operating System and NetHopper™ Internet Software); (ii) a Pippin™ computer system from Apple Computer, Inc.; (iii) a network computer (NC) that supports the Java™ programming language and Java applets expressed therewith; (iv) a Sony® WebTV Internet Terminal (supported by the WebTV Service provided by WebTV Network, Inc.); or the like. As shown in FIG. 1, each Client Computer is interfaced with an ISP 13 in a conventional manner. Each such Client System may be assigned a static TCP/IP address and a unique domain name on the Internet, or one may be dynamically assigned thereto by way of its ISP depending on its connectivity. Optionally, each Client System may include Web-site server software for creating and maintaining one or more hypermedia-type Web-sites in a manner well known in the art.

Typically, each Client System 5 will be maintained by consumers (and/or) potential consumers of products and/or services, about which information can be found on the Internet. It is understood, however, that a Client System can be realized in the form of computer-based kiosks located in supermarkets, department stores, retail outlets, or other public location where products and/or services are being sold or offered for sale, and/or serviced. In one embodiment of the computer-based kiosk, a visual display screen, keyboard and pointing device would be provided in the conventional manner to enable consumers to operate its GUI-based browser and thus carry out the method of the present invention. In an alternative embodiment of the kiosk-based Client System, an integrated bar code reader is provided for reading UPC symbols printed on products (as well as UPNs printed on service-related brochures), and a visual display screen is provided for viewing product and service related information automatically displayed thereon in response to the entry of the UPSN information scanned into the system.

The Database Structure of the IPSD Server

In the illustrative embodiment of the present invention, each data-synchronized IPSD Server 4 of the preferred embodiment maintains at least two different relational-type databases, namely: a IPSI Registrant Database for storing information about manufacturers and/or service providers whose products and/or services are registered with the system; and a Non-IPSI Registrant Database for storing information about manufacturers and/or service providers whose products and/or services are not registered with the system. A schematic representation of the IPSI Registrant Database is shown in FIG. 2A1, whereas a schematic representation of the Non-IPSI Registrant Database is shown in FIG. 2B.

As shown in FIG. 2A1, the relational-type IPSI Registrant Database maintained by each IPSD Server comprises a plurality of labeled information fields for each product or service "registered" therewith, namely: an IP/SN Information Field for storing information (e.g. numeric or alphanumeric string) representative of the Universal Product or Service Number (e.g. twelve digit UPC number) assigned to the product or service; a Company Name Information Field for storing information (e.g. numeric or alphanumeric string) representative of the name of the company making, selling or distributing the corresponding product or service; a URL Information Field for storing information (e.g. numeric or alphanumeric string) representative of the Universal Resource Locator (URL) or Universal Resource Locators (URLs) at which information (or the multimedia type) can be found on the Internet relating to the corresponding product or service; a Trademark/Servicemark Information Field for storing information (e.g. text and/or alphanumeric strings) representative of each trademark used in connection the promotion, sale, distribution and/or use of the corresponding product or service, and preferably registered with the United States Patent and Trademark Office (USPTO) or other governmental agency; a Product Description Information Field for storing information (e.g. text strings) descriptive of the corresponding product or service; an E-mail Address Information Field for storing information (e.g. numeric or alphanumeric string) representative of the e-mail address of the corresponding company (e.g. manufacturer) on the Internet; and a Status Information Field for storing information (e.g. numeric or alphanumeric string) representative of whether the company associated registered product or service has paid their monthly, quarterly or annual registration fees associated with registration within the IPSD Servers of the information finding system hereof. Notably, each information item contained with the information field shown along the same horizontal line of FIG. 2A1 are related or linked.

In general, the URL stored in the URL Information Field specifies the address of an information resource on the Internet (Web), and thus may point to any one of the following types of information resources: a HTML document or file on the World Wide Web (expressed in the HyperText Markup Language); a single record in a database; the front-end of an Internet program such as Gopher; or the results of a query made using another program. In accordance with convention, the syntactic structure of each URL generally comprises: a Protocol Specifier, such as "http", "ftp", "gopher", "news", or "mailto", and specifies the type of resource to which the URL is pointing (i.e. connecting) to; a Host Indicator, represented by double slashes "//" if the URL is requesting information from a Web Server; Server Name comprising a Internet Domain Name (e.g. "www."), the address of the Web Server (e.g. "ibm."), and a designator (e.g. "com", "edu", "int", "mil", "net", "org", etc.) identifying who owns the server or where it is located; a Path Name, such as "Products/Computers/", indicating a path to the destination information file on the identified Server; and a Resource Name (including file extension, e.g. ".html"), such as "aptiva.html", identifying the actual named information file that contains existing information resource specified by the URL.

As used herein, as well as in the claims to Invention, the term "registered" and the variants thereof shall be understood to mean listed or having an entry within a database. Such listing or entry can be achieved in a variety of ways including, but not limited to the following: (i) by specific request of the associated company or business; or (ii) by the system administrator without a request and/or authorization of the corresponding company or business linked to the product or service.

Notably, each information item contained within the information field shown along the same horizontal line of FIG. 2A1 are symbolically related or linked. Different products and/or services of the same registrant or related registrant may also be linked together so that a user looking for information about a particular product or service is automatically provided URLs which are assigned to related products of the registrant. The automated linking of the URLs may satisfy the goals or objectives of a particular advertising and/or marketing campaign or product/service promotion program of the registrant company. As it may be desirable to relate particular products and services at particular points in time, the relationships therebetween can be dynamically changed dynamically within the IPSI Registrant Database. This can be effected by a straightforward database updating operation of the system administrator (or manager) who, in theory, can be located virtually anywhere throughout the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve (12) digit numeric string will be a preferred UPN (in many applications) for purposes of carrying out the principles of the present invention. This twelve (12) digit human-readable number, printed on the bottom of each UPC label (and encoded within the bars and spaces of the UPC label itself), comprises: (i) a six digit manufacturer number assigned to the manufacturer by the Uniform Code Council, Inc. (UCC) of Dayton, Ohio, and consisting of a one digit "number system" number and a five digit manufacturer code; (ii) a five digit product number assigned to the product by the manufacturer; and (iii) a one digit modulo check digit (mathematically calculated) and added to each UPC number to ensure that the code has been read correctly by the bar code reader.

In order to provide the requester greater control over what information is actually displayed on its Client System, the URL Information Field of the IPSI Database shown in FIG. 2A1 contains a number of information subfields. As shown in FIG. 2A2, these information subfields comprise: a Product Advertisement Information Field for storing information representative of URLs pointing to information on the Internet relating to advertising and/or promotion of the product; a Product Specification (Description) Information Field for storing information representative of URLs pointing to information on the Internet relating to specifications on the product; a Product Update Information Field for storing information representative of URLs pointing to information on the Internet relating to product updates, recalls, notices, etc; a Product Distributor Information Field for storing information representative of URLs pointing to information on the Internet relating to distribution, sale and/or ordering of the product; a Product Warranty/Servicing Information Field for storing information representative of URLs pointing to information on the Internet relating to warranty, extended warranty offerings, servicing and maintenance of the product; a Product Incentive Information Field (e.g. rebates, discounts and/or coupons) for storing information representative of URLs pointing to information on the Internet relating to rebates, discounts and sales on the product; a Product Review Information Field for storing information representative of URLs pointing to information on the Internet relating to reviews, analysis, testing, inspection and/or comparison of the product; and Miscellaneous Information Field for storing information representative of URLs pointing to information on the Internet relating to miscellaneous aspects of the product. Each URL symbolically linked to each registered product in the Registered IPSI Database is categorized within one or more of these URL categories. Preferably, the manufacturer and its advertising and marketing personnel will actively participate in the selection of the URLs and their classification into the above-defined (or like) categories. Through such participation, the business objectives of any particular company can be promoted by the product information finding system of the present invention. Preferably, easy-to-read display screens are used to display and to select URLs contained within the above-described information subfields. In this way, the requester is provided with soley the kind of product-related information which he or she seeks.

It is understood that at present, few (if any) services have been assigned a UPC number in the manner that nearly all consumer products have been assigned in the contemporary period. In spite of this fact, however, the present invention contemplates the need and utility of widespread assignment of UPC (or similar) numbers to particular services (as well as the imprinting of UPC (or similar) symbols on printed service brochures and advertisements. Notably, assigning UPC (or like) numbers to particular services, and labeling printed and graphical brochures and advertisements with such universal numbers, will provide a number of new opportunities hitherto unavailable.

In particular, service-related information could be easily found (i.e. located and accessed) on Web-sites using the system and method of the present invention, and thereafter the service easily procured through an electronic data transaction. In accordance with the present invention, this can be achieved by uniquely identifying and assigning "particular" services by a Universal Service Code (USC) which has many if not all of the attributes of a conventional UPC. While not necessary, a single digit may be optionally added to the USC in order to demark that services, rather than products are being identified. An example of such USC labeling would be the printing of an assigned UPC label (number) on: admission tickets to a theatrical, dramatic or musical performance and/or its playbill; admission tickets to a movie; admission tickets to a concert and/or its concert program; admission tickets to a sporting event and/or its sports program; admission tickets to an art, science or history museum; admission tickets to the zoo or botanical gardens; and the like. The UPC label would be encoded to identify a particular event at which an entertainment, educational or professional service is provided. The UPC label printed on the tangible medium associated with the promotion of or access to the particular service would then be registered with the IPSI Registrant Database of the system hereof, along with the name of the provider of the service, and a list of URLs that identify the Web locations at which particular kinds of information related to the particular service can be found (in accordance with the categories of FIG. 2A2).

As shown in FIG. 2B, the Non-IPSI Registrant Database maintained by each IPSD Server comprises a plurality of labeled information fields for each product or service that is not currently registered with the IPSD Server, namely: an IPSN (i.e. IPN and ISN) information Field for storing information (e.g. numeric or alphanumeric string) representative of the Universal Product or Service Number (e.g. a number from a UPC numbering system—a UPC number—) assigned to the non-registered product or service; a Company Name Information Field for storing information (e.g. numeric or alphanumeric string) representative of the name of the company making, selling or distributing the corresponding non-registered product or service; a Trademark/Servicemark Information Field for storing information (e.g. text and/or alphanumeric strings) representative of each trademark (or servicemark) used in connection with the promotion, sale, distribution and/or use of the corresponding product or service, and preferably registered with the USPTO or other governmental agency; a Product Description Information Field for storing information (e.g. text strings) descriptive of the corresponding product or service; and an E-mail Address Information Field for storing information (e.g. numeric or alphanumeric string) representative of the e-mail address of the corresponding company (e.g. manufacturer) on the Internet; a Status Information Field for storing information (e.g. numeric or alphanumeric string) representative of whether the company associated non-registered product or service has been solicited by the IPSD Server, and on what dates registration solicitation has occurred. Notably, each information item contained with the information field shown along the same horizontal line of FIG. 2A1 are related or linked. The information required to construct the Non-IPSI Registrant Database shown in FIG. 2B can be readily obtained from a number of commercially or publicly available information sources (e.g., the Universal Code Council, Inc., Dayton, Ohio; Quickresponse Services, Inc. Of Richmond. Calif.; General Electric Information Services (GEIS) of Delaware, Md.; Infotest International, http://www.infotest.com, etc.).

Figure 3A:
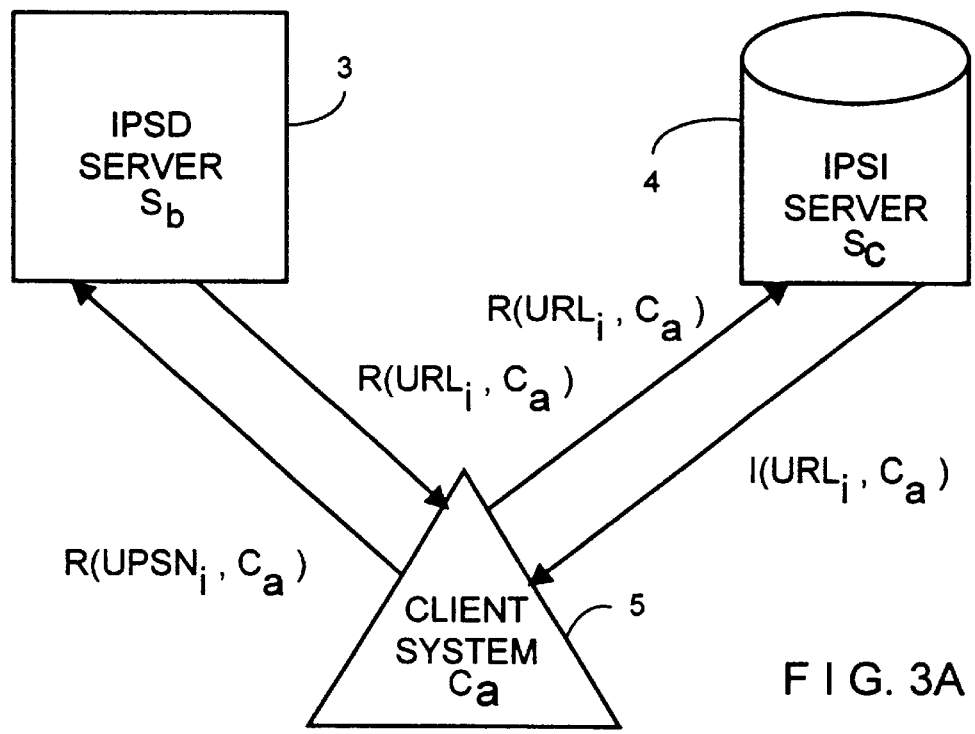
FIG. 3A is a schematic diagram illustrating the high level structure of a first type of communication protocol that can be used among the Client System $C_a$, the IPSD Server $S_b$, and the IPSI Server $S_c$ of the IPSI finding system hereof when the GUI browser program running on the Client System is in its IPSI Finder Mode of operation, requesting as input a UPSN (i.e. UPN or USN data structure) to determine the URL(s) of the corresponding product (or service) registered therewith.
Figure 3B:
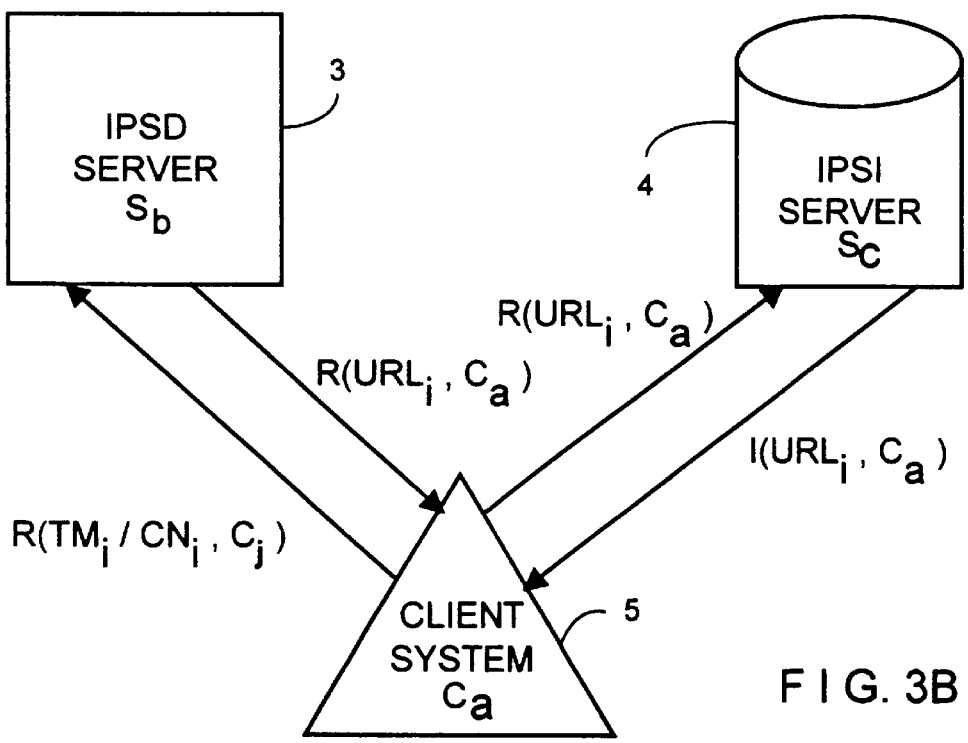
FIG. 3B is a schematic diagram illustrating the high level structure of a first type of communication protocol that can be used among the Client System $C_a$, the IPSD Server $S_b$, and the IPSI Server $S_c$ of the IPSI finding system hereof when the GUI browser program on the Client System is in its UPSN Search Mode of operation, requesting as input a trademark (or servicemark) and/or company name in order to determine the UPSN (i.e. UPN or USN data structure) of the corresponding product (or service) and thus the URL(s) registered therewith.
Figure 4A:
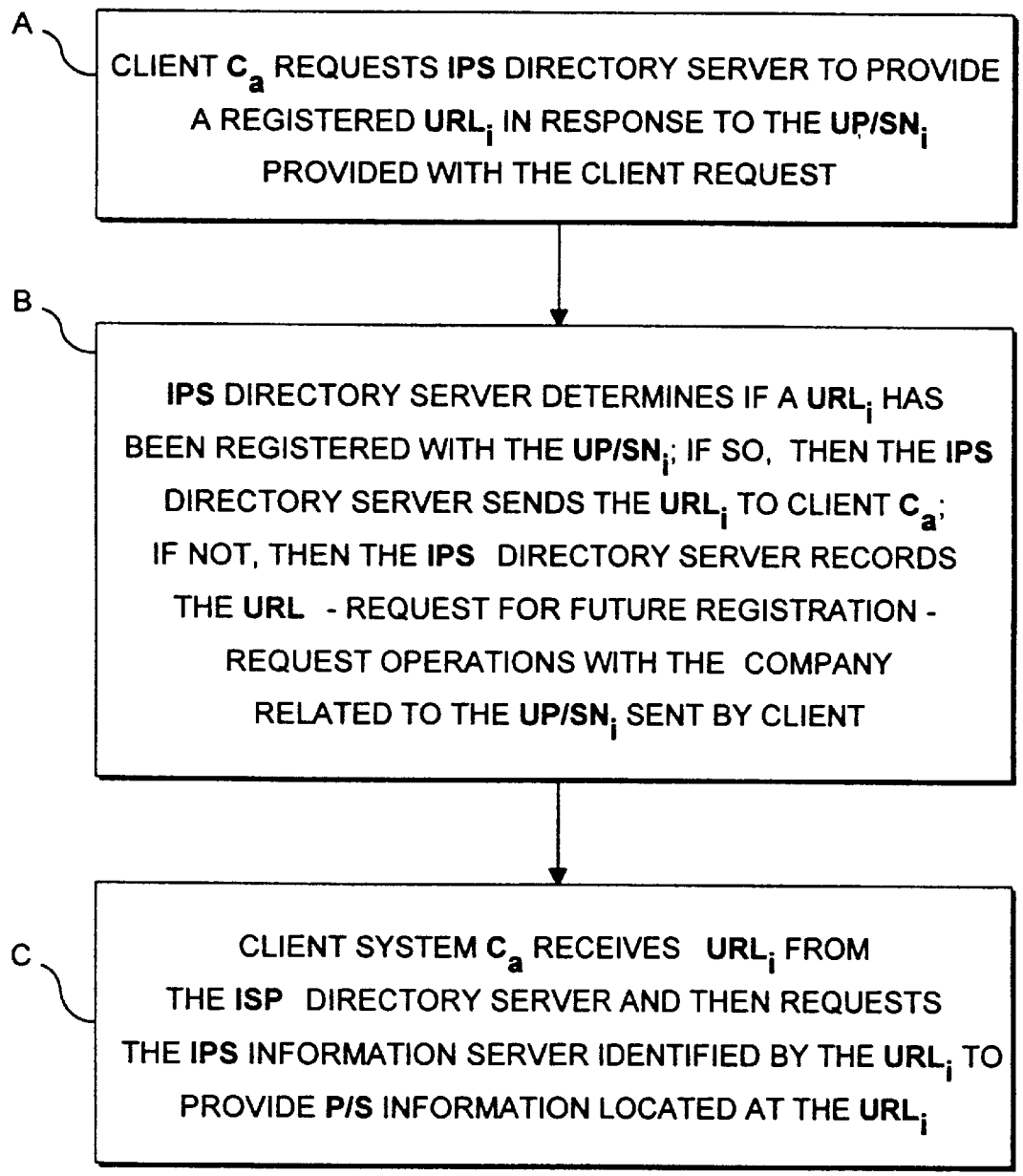
FIG. 4A is a high level flow chart illustrating the steps involved in carrying out the communication protocol shown in FIG. 3A when the Client System is in its IPSI Finder Mode of operation.
Figure 4B:
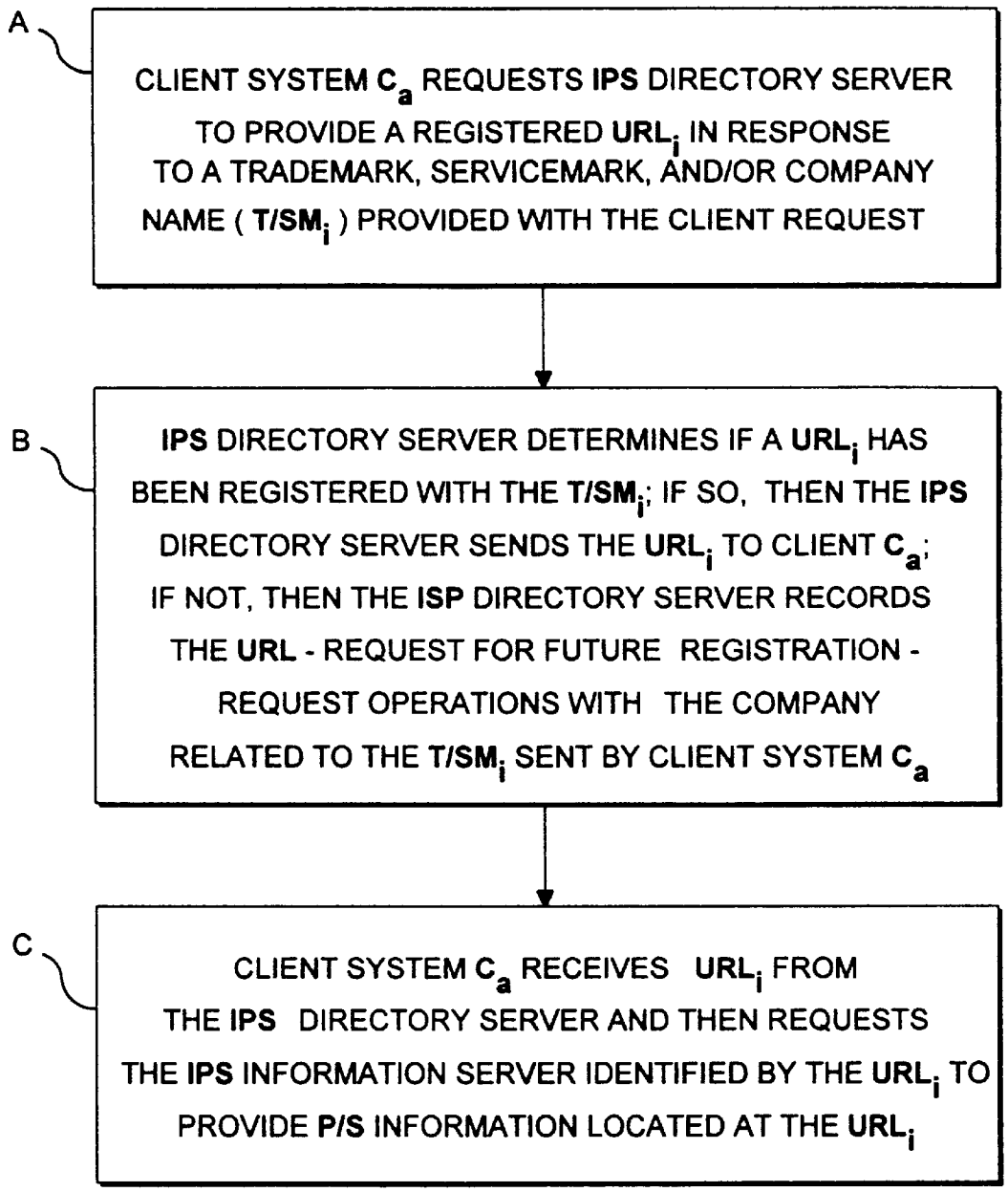
FIG. 4B is a high level flow chart illustrating the steps involved in carrying out the communication protocol shown in FIG. 3A when the Client System is in its UPSN Search mode of operation.
Figure 5A:
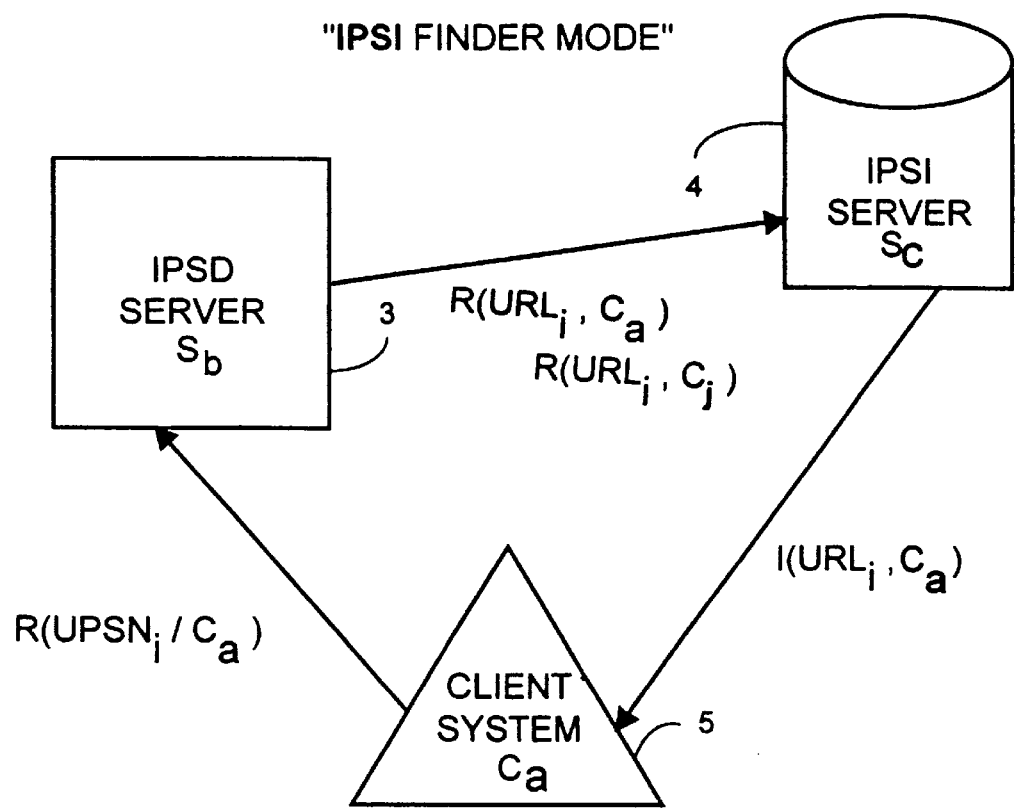
FIG. 5A is a schematic diagram illustrating the high level structure of a second type of communication protocol that can be used among the Client System $C_a$, the IPSD Server $S_b$, and the IPSI Server $S_c$ of the IPSI finding system hereof when the GUI browser program on the Client System is in its IPSI Finder Mode of operation, requiring as input a UPSN to determine the URL(s) of the corresponding product (or service) registered therewith.
Figure 5B:
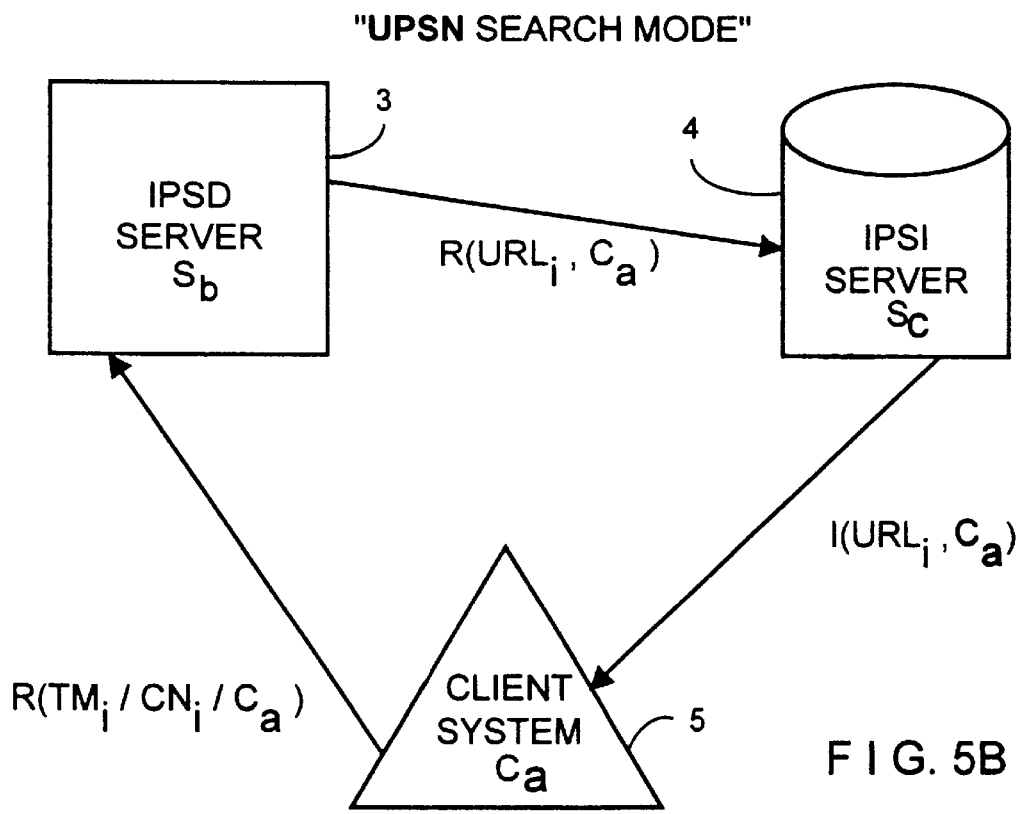
FIG. 5B is a schematic diagram illustrating the high level structure of a second type of communication protocol that can be used among the Client System $C_a$, the IPSD Server $S_b$, and the IPSI Server $S_c$ of the IPSI finding system hereof when the GUI browser program on the Client System is in its UPSN Search Mode of operation, requiring as input a trademark (or servicemark) and/or company name in order to determine the UPSN of the corresponding product (or service) and thus the URL(s) registered therewith.
Figure 6A:
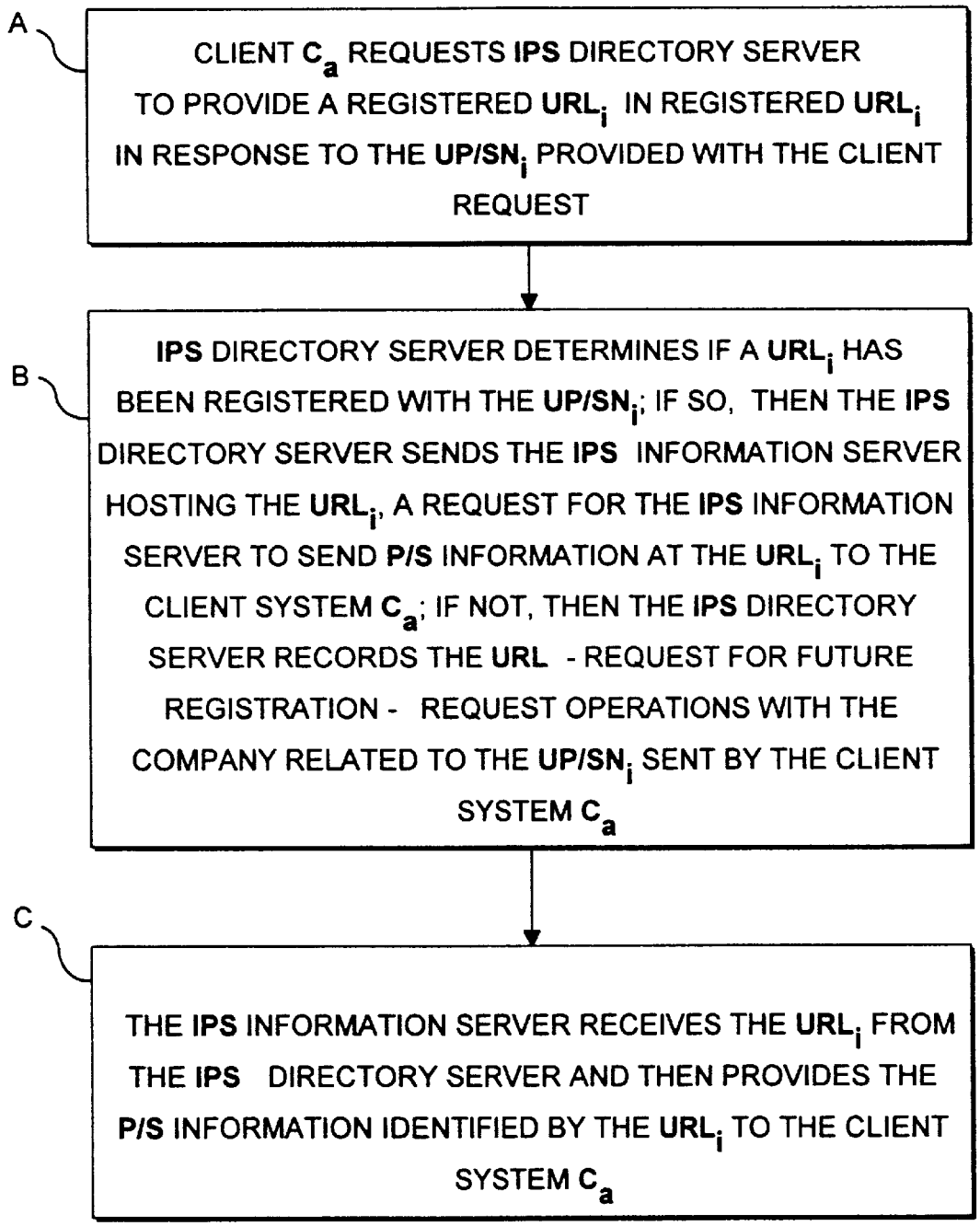
FIG. 6A is a high level flow chart illustrating the steps involved in carrying out the communication protocol shown in FIG. 5A when the Client System is in its IPSI Finder Mode of operation.
Figure 6B:
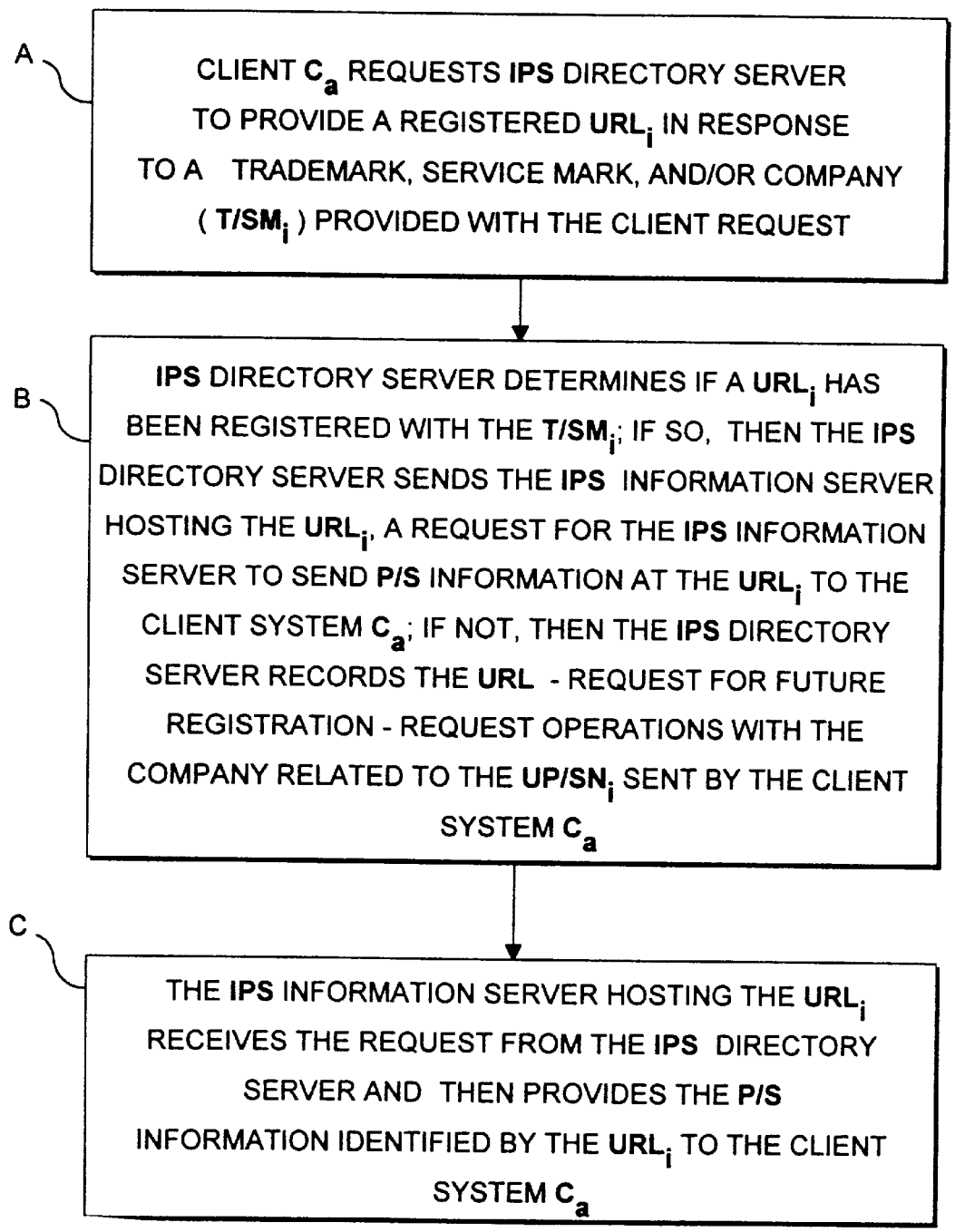
FIG. 6B is a high level flow chart illustrating the steps involved in carrying out the communication protocol shown in FIG. 5A when the Client System is in its UPSN Search mode of operation.

Communication Protocols For Carrying Out The System And Method Of The Present Invention In general, there are a number of possible communication protocols that can be used to carry out the system and method of the present invention. In FIGS. 3A and 3B, a first communication protocol is schematically depicted for a first system having both the IPSI Finder and UPSN Search Modes of operation, whereas the basic operations carried out thereby are shown in FIGS. 4A and 4B. In FIGS. 5A and 5B, a second communication protocol is schematically depicted for both the IPSI Finder and UPSN Search Modes of operation, whereas the basic operations carried out thereby are shown in FIGS. 6A and 6B. The details of such protocols will be described below.

Referring to FIG. 3A, the high level structure is shown for a first-type of communication protocol that can be used among the Client System $C_a$, the IPSD Server $S_b$, and the IPSI Server $S_c$ of the IPSI finding system hereof when the GUI browser program on the Client System is in its IPSI Finder Mode of operation. FIG. 4A provides a high level flow chart illustrating the steps involved in carrying out this communication protocol when the Client System is in its IPSI Finder Mode of operation.

In order to enter the IPSI Finder mode of the system, the user selects the "IPSI Finder" button on the GUI-based browser display screen. Then at Block A of FIG. 4A, a UPSN is provided as input to IPSD Server $S_b$, and in response thereto the Client System $C_a$ requests the IPSD Server $S_b$ to provide each registered $URL_i$ stored in the IPSI Registrant Database.

At Block B in FIG. 4A, the IPSD Server $S_b$ analyses the IPSI Registrant Database shown in FIG. 2A1 to determine whether or not a symbolically linked $URL_i$ has been registered with $UPSN_i$ that has been provided as input. If so, then the IPSD Server sends the symbolically linked $URL_i$ to the Client System $C_a$. If not, then the IPSD records in the URL-request in the Non-IPSI Registrant Database shown in FIG. 2B.

At Block C in FIG. 4A, the Client System $C_a$ receives the $URL_i$ from the IPSD Server. Then, in response to a URL selection query based on the content of information subfields shown in FIG. 2A2 and displayed on the screen of the Client System $C_a$, the client system $C_a$ requests the IPSI Server, identified by the user selected $URL_i$, to provide the product or service information located by the registered $URL_i$. Having accessed and displayed such product or service related information at the Client System, the user can review the information at the specified $URL_i$, acquire knowledge about the product or service, and may, if the option is provided at the URL-specified Web-site, purchase the product or procure (i.e. contract for) the service by way of an on-screen electronic commercial transaction. Such commercial transaction can involve product ordering, delivery specification, and financing through the use of credit or debit card transactions, COD arrangements, or any other financial arrangement acceptable to the vendor of the product or service.

Referring to FIG. 3B, the high level structure is shown for the first-type of communication protocol that can be used among the Client System $C_a$, the IPSD Server $S_b$, and the IPSI Server $S_c$ of the IPSI finding system hereof when the GUI browser program on the Client System is in its UPSN Search Mode of operation. FIG. 4B provides a high level flow chart illustrating the steps involved in carrying out this communication protocol when the Client System is in its UPSN Search Mode of operation.

In order to enter the UPSN Search Mode of the system, the user selects the "UPSN Search" button on the GUI-based browser display screen. Then at Block A of FIG. 4B, a trademark $TM_i$ (or servicemark $SM_i$) and/or a company name $CN_i$ is provided as input to IPSD Server $S_b$ by way of the browser display screen. Then in response thereto, the Client System $C_a$ requests the IPSD Server $S_b$ to provide each registered $UPSN_i$ stored in the IPSI Registrant Database, and if so, then also its $URL_i$ to the Client System.

At Block B in FIG. 4B, the IPSD Server $S_b$ analyses the IPSI Registrant Database shown in FIG. 2A1 to determines whether or not a symbolically linked $UPSN_i$ has been registered with a $TM_i$ (or $SM_i$) and/or a company name $CN_i$ that have been provided as input to the IPSD Server $S_b$ by way of the browser display screen. If so, then the IPSD Server sends to the Client System $C_a$, the $URL_i$ that is symbolically linked to the registered $UPSN_i$. If not, then the IPSD records in the URL-request in the Non-IPSI Registrant Database shown in FIG. 2B for future registration-request operations related to the $T/SM_i$ sent by the Client System.

At Block C in FIG. 4B, the Client System $C_a$ receives the $URL_i$ from the IPSD Server. Then, in response to a URL selection query based on the contents of the information subfields shown in FIG. 2A2 and displayed on the screen of the Client System $C_a$, the Client System requests the IPSI Server, identified by the user selected $URL_i$, to provide the product or service information. Having accessed and displayed such product or service related information at the Client System, the user can review the information at the specified $URL_i$, acquire knowledge about the product or service, and may, if the option is provided at the URL-specified Web-site, purchase the product or procure (i.e. contract for) the service by way of an on-screen electronic commercial transaction, as described hereinabove.

Referring to FIG. 5A, the high level structure is shown for a second, alternative type of communication protocol that may be used among the Client System $C_a$, the IPSD Server $S_b$, and the IPSI Server $S_c$ of the IPSI finding system hereof when the GUI browser program on the Client System is in its IPSI Finder Mode of operation. FIG. 6A provides a high level flow chart illustrating the steps involved in carrying out this communication protocol when the Client System is in its IPSI Finder Mode of operation.

In order to enter the IPSI Finder mode of the system, the user selects the "IPSI Finder" button on the GUI-based browser display screen. Then at Block A of FIG. 6A, a UPSN is provided as input to IPSD Server $S_b$, and in response thereto the Client System $C_a$ requests the IPSD Server $S_b$ to provide each registered $URL_i$ stored in the IPSI Registrant Database.

At Block B in FIG. 6A, the IPSD Server $S_b$ analyses the IPSI Registrant Database shown in FIG. 2A1 to determine whether or not a symbolically linked $URL_i$ has been registered with $UPSN_i$ that has been provided as input. If so, then in response to a URL selection query based on the contents of the information subfields shown in FIG. 2A2 and displayed on the screen of the Client System $C_a$, the IPSD Server $S_b$ sends to the IPSI Server $S_c$ hosting the user-selected $URL_i$, a request for the IPSI Server $S_c$ to send product or service information at the selected $URL_i$ to the requesting Client System $C_a$. If the IPSD Server $S_b$ determines that there does not exist a $URL_i$ in the IPSI Registrant Database symbolically linked with the $UPSN_i$ provided as input to the Client System $C_a$, then the IPSD Server $S_b$ records the URL-request in the Non-IPSI Registrant Database for future registration operations with the company related to the input $UPSN_i$.

At Block C in FIG. 6A, the IPSI Server $S_c$ receives the user-selected $URL_i$ sent from the IPSD Server $S_b$ and then provides to the Client System $C_a$, the product or service information located by the registered $URL_i$. Having accessed and displayed such product or service related information at the Client System, the user can review the information at the selected $URL_i$, acquire knowledge about the product or service, and may, if the option is provided at the URL-specified Web-site, purchase the product or service by way of an on-screen electronic commercial transaction.

Referring to FIG. 5B, the high level structure is shown for the second-type of communication protocol that can be used among the Client System $C_a$, the IPSD Server $S_b$, and the IPSI Server $S_c$ of the IPSI finding system hereof when the GUI browser program on the Client System is in its UPSN Search Mode of operation. FIG. 6B provides a high level flow chart illustrating the steps involved in carrying out this communication protocol when the Client System is in its UPSN Search Mode of operation.

In order to enter the UPSN Search Mode of the system, the user selects the "UPSN Search" button on the GUI-based browser display screen. Then at Block A of FIG. 6B, a trademark $TM_i$ (or servicemark $SM_i$) and/or a company name $CN_i$ is provided as input to IPSD Server $S_b$ by way of a dialogue box displayed on the browser display screen. In response thereto, the Client System $C_a$ requests the IPSD Server $S_b$ to determine whether or not a registered $UPSN_i$ (and thus symbolically linked $URL_i$) is stored in the IPSI Registrant Database. If so, then in response to a URL-selection query based on the content of the information subfields shown in FIG. 2A2 and displayed on the display screen of the Client System $C_a$, the IPSD Server $S_b$ sends the IPSI Server $S_c$ hosting the user-selected $URL_i$, a request for the IPSI Server $S_c$ to send product or service information at the selected $URL_i$ to the requesting Client System $C_a$. If the IPSD Server $S_b$ determines that there is no registered $UPSN_i$ (and thus no symbolically linked $URL_i$) stored in the IPSI Registrant Database, then the IPSD Server records the URL request in the Non-IPSI Registrant Database for future registration operations with the company related by the $UPSN_i$ sent by the Client System $C_a$.

At Block C in FIG. 6B, the IPSI Server hosting the user-selected $URL_i$ receives the request from the IPSD Server $S_b$ and then provides the product or service information identified by the registered $URL_i$. Having accessed and displayed such product or service related information at the Client System, the user can review the information at the specified $URL_i$, acquire knowledge about the product or service, and may, if the option is provided at the URL-specified Web-site, purchase the product or service by way of an on-screen electronic commercial transaction.

The communication protocols described above can be realized using any suitable programming language including, for example, an object-oriented programming language such as the Java programming language.

Registration Of Products And Services With The IPSI System

The utility of the product and service finding tool of the present invention depends in large part on the number of products and services registered with the IPSI system. In principle, numerous techniques may be employed separately as in combination with each other in order to construct the IPSI and Non-IPSI Registrant Databases supported by the IPSD Servers of the present invention. Five such techniques will be detailed below.

According to a first database construction technique, product registration requests (PRRs) are sent out to each and every company (i.e. manufacturer) which has been issued a six digit UPC Manufacturer Identification Number (MIN) by the UCC, Inc. For the various products which such manufacturers sell, the product registration request should ascertain the various information elements identified in the IPSI Registrant Database of FIGS. 2A1 and 2A2 in order to construct the same.

According to a second database construction technique, a global advertising campaign is launched in order to solicit the various information elements identified in the IPSI Registrant Database of FIG. 2A1 and 2A2 thus register the products (and services) of companies and businesses participating in the program. Preferably, such information is collected by way of e-mail to facilitate database construction operations.

According to a third database construction technique, the IPSI system itself continuously solicits product registrations over time in order to collect information from companies responding favorably to the solicitations. Such solicitation efforts can involve the issuance of product registration requests.

According to a fourth database construction technique, a number of commercial Internet search engines, such as Altavista™, Yahoo™, WebCrawler™, Lycos™, Excite™, and powerful off-line parallel computing machines are enlisted to analyze (i.e. mine) information on the World Wide Web in order to collect and link the information elements specified in the IPSI Registrant Database of FIG. 2A1.

Once an "initial" IPSI Registrant Database has been constructed using any one or more of the four database construction techniques described hereinabove, companies registered therewith can be periodically contacted in order to update, expand or otherwise the accuracy of the information contained within the database of the IPSI system.

According to a fifth database and preferred construction technique of the present invention, the IPSI Database of the system is initially "seeded" with several items of information obtained and related without the assistance of such manufacturers. Such information items include: (1) the six digit UPC Manufacturer Identification Numbers used in the UPC symbols (i.e. numbers) applied to the products thereof; and (2) the URLs of the Web home pages of UCC-registered manufacturers.

The first step of this database construction method involves obtaining the six digit manufacturer codes issued to specific manufacturers (or vendors) by the Uniform Code Council, Inc. of Dayton, Ohio, or be obtained from various commercial sources including GE Information Services, QuickResponse Services, Inc. At present, about 95,000 manufacturers identification numbers have been issued to manufacturers by the UCC. A string of six zeros (i.e. 000000) may be added to each one of these 95,000 or so six digit Manufacturer Identification Number in order to produce 95,000 or so 12 digit numbers (i.e. hereinafter referred to as "Manufacturer's Reference Numbers) for the 95,000 or so manufacturers (i.e. Vendors) listed in the IPSI Registrant Database under construction. As each such Manufacturer Reference Number has the same length as a UPC number of its manufacturer, this number can be stored in the UPSN Information Field of the Database along with the corresponding manufacturers name being stored in the Company Name Information Field.

The second step of the method involves finding the URL of the Web home page of each of the 95,000 manufacturers who have been assigned a Manufacturers Identification Code and are listed in the Database. Such URL information can be found using conventional off-line search engines that use the name and address of the manufacturer to find the URL of the home page of its Web-site, if it has one. Such URLs are then added to the Database, along with e-mail and/or other addresses of the manufacturer symbolically linked thereto.

Having constructed the "seeded" Database, it can then be used to connect the Client System of users to the home page of Web-sites of manufacturers of particular products. Initially, when an Internet user provides as input to the Client System operating in its UPSN Search Mode, either the first six or all 12 digits of a UPC number (associated with a particular product or service), the IPSD Server need only compare the input UPC number against the six digit Manufacturer Identification Number portion of the Manufacturers Reference Number listed in the "seeded" Database. The corresponding URL of the matching manufacturer is returned to the Client System $C_a$. In instances of an initially seeded Database, wherein only the six digit Manufacturer Indentification Numbers (or twelve digit Manufacturer Reference Numbers) are listed therein, the users are provided with the URLs of the home pages of the symbollically linked manufacturers (i.e. companies). Then, through mass mailings, advertisement and/or marketing and promotional efforts, the companies whose Manufacturer Identification Numbers (or Manufacturer Reference Numbers) are listed in the Database, as the case may be, are then contacted and requested to actively participate in linking the UPC numbers of their products with the URLs identifying whereon the Internet desired types of product-related information are located. When such URLs are registered within the Database, an inquiring Internet user knowing the corresponding UPC number can specify the exact location of a file containing information on the Web about any particular product (or service). Over time, the Manufacturer Reference Number of each manufacturer will become replaced by the UPC numbers and linked URLs on the WWW, and the users of the system can precisely pinpoint product-related information identified by the manufacturer, its marketing department and/or advertising agency. With manufacturer and advertiser participation and feedback, the initially seeded Database described hereinabove will gradually grow into a robust relational database richly filled with the various information items described in FIGS. 2A1 and 2A2, including the symbolically linked UPCs and URLs that point to very specific information files within IPSI Servers randomly located throughout the Internet.

Operation of the IPSI Finding System and Method

Figure 1A:
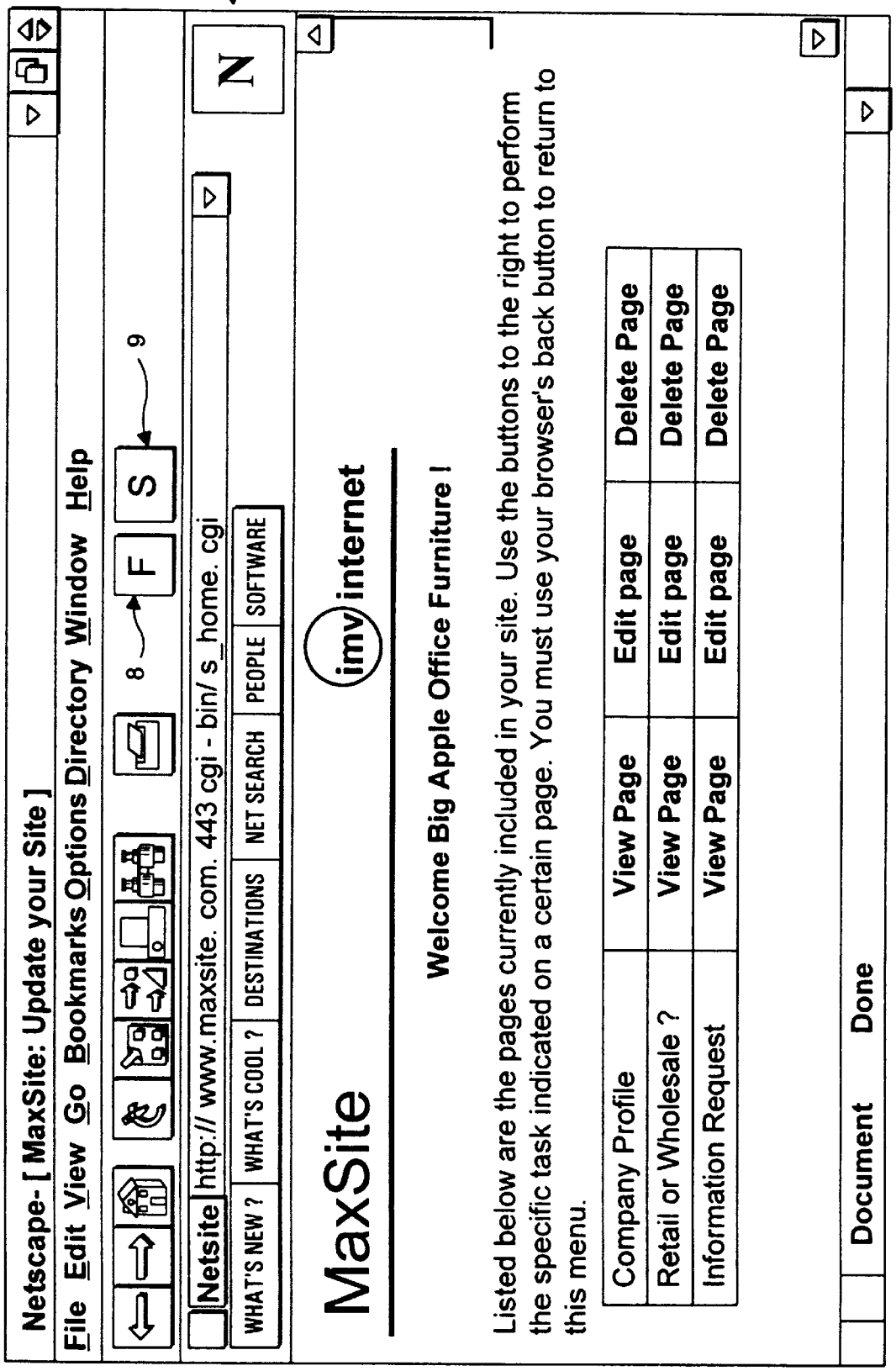
FIG. 1A is a schematic representation of an exemplary display screen produced by a graphical user interface (GUI) based web browser program running on a Client System and providing an on-screen IPSI Finder button and an on-screen UPSN Search button for carrying out the IPSI finding method of the present invention.
Figure 1B:
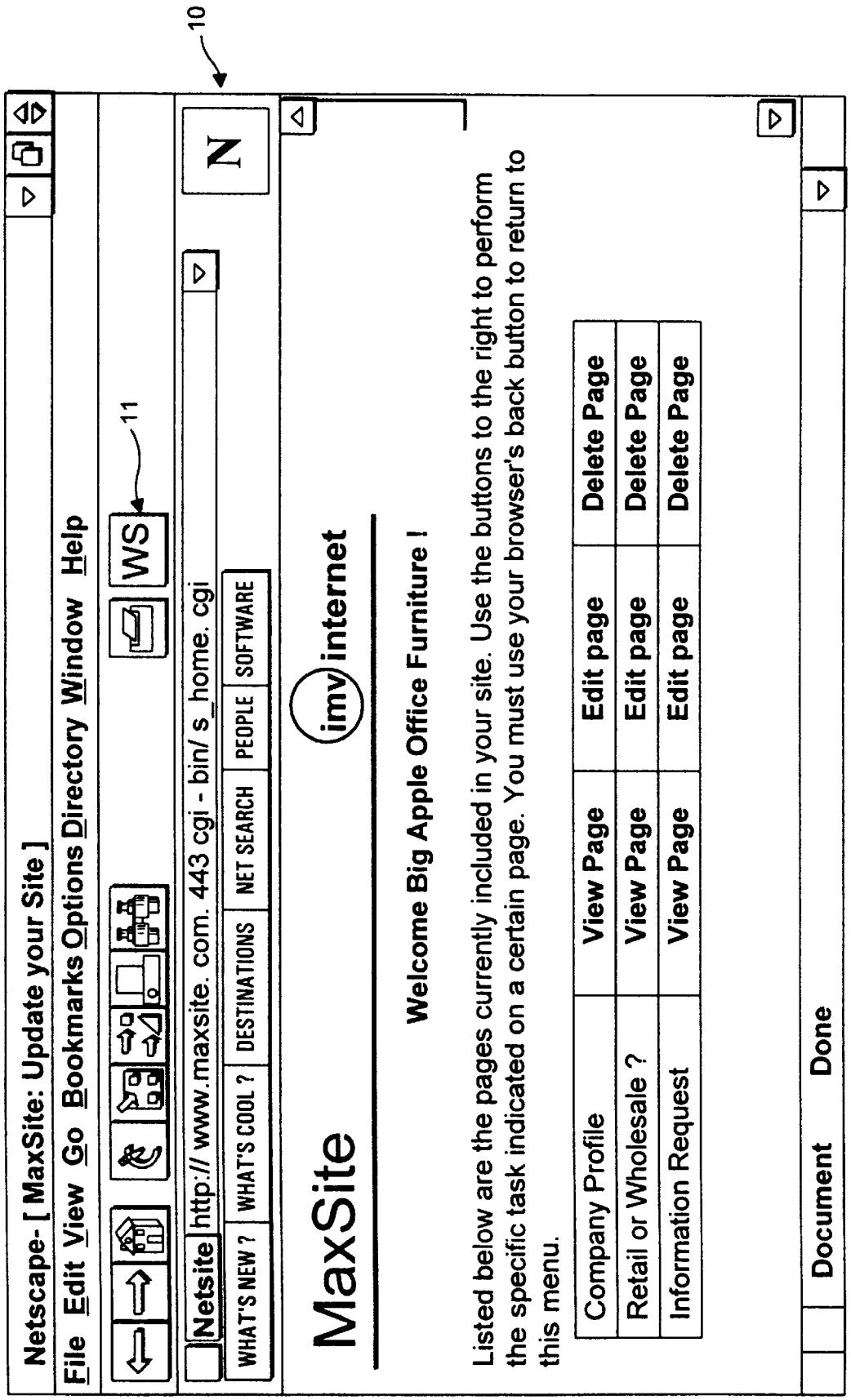
FIG. 1B is a schematic representation of an exemplary display screen produced by a GUI-based web browser program running on a Client System and providing an on-screen IPSD Web-site Finder button for instantly connecting to the IPSD Web-site and carrying out the Internet Product and Service Information finding method of the present invention.

In each of the above-described embodiments of the system hereof shown in FIGS. 1A and 1B, the GUI-based Internet browser program of each Client System is provided with two independent modes of operation, namely: the "IPSI Finder Mode" and the "UPSN Search Mode".

When the "IPSI Finder" button is selected, the system (i.e. browser program) enters its the IPSI Finder Mode. Preferably, the user is provided with a choice of language (e.g. English, German, French, Japanese, Chinese, etc.) by way of an appropriate menu-selection screen. After the desired language selection is made, the home page is displayed upon the Client System's display screen. A typical display screen produced from the IPSD Server might read as follows:

> Welcome to UPC-REQUEST™, the only Universal Product Information Finding System on the Internet.
>
> Have you purchased a particular product, or are you considering the purchase of a particular product, on which you would like current, up-to-date information from the manufacturer or advertiser?
>
> Look no further than the UPC-REQUEST™ Universal Product Information Finding System."

When the system is in this operational mode, as illustrated in FIGS. 3A, 4A and 5A, 6A, a Web-based information resource pertaining to any commercial product or service registered with the system can be displayed and selected by the user in order to automatically access the same from the Internet. Such information resources can include advertisements, specifications, operation descriptions, product simulations, purchase information, maintenance information, warranty and servicing information, product updates, distributor information, incentives (e.g. discounts, rebates, coupons, etc.), electronic data transaction screens, etc. In this mode, desired product or service information is obtained by simply manually entering the registered product's UPN (e.g. its UPC's 12 digit numerical string) or the registered service's USN (e.g. its UPC's 12 digit numerical string) into the dialogue box of the Internet browser or Internet application tool. When using the seeded IPSI Database described hereinabove, only the first six digits of the UPC number need be entered into the dialogue box. An exemplary display screen produced from the IPSD Server might be as follows:

> "Simply enter the 12 digit UPC the particular product; click REQUEST, and then wait for the display of the list of Web locators (URLs) at which the desired product information can be found on the Internet."

Alternatively, a bar code symbol scanner can be used to enter the UPSN (e.g. UPC or USC number) into the system, thereby avoiding manual keyboard entry operations.

In response to such data entry operations, a list of URLs organized according to the information subfield classifications set forth in FIG. 2A2 are displayed on Client System $C_a$ making the request of the IPSD Server. At this stage, another display screen would appear with an exemplary message as follows:

> "Please select the URL from the displayed URL list using the information subfield product information category displayed above. This will connect you to the product information related to the selected URL. You can return to the URL display list at anytime."

Upon selecting a particular URL from the displayed URL list, video and audio information content are automatically displayed on the Client System from the IPSI Server hosting the selected URL.

When the "UPSN Search" button is selected, the system enters its UPSN Search Mode". Preferably, the user is provided with a choice of language (e.g. English, German, French, Japanese, Chinese, etc.) by way of an appropriate menu-selection screen.

When the system is in this operational mode, as illustrated in FIGS. 3B, 4B and 5B, 6B, a predesignated information resource pertaining to any commercial product or service registered with the system can be automatically accessed from the Internet and displayed from the Internet browser of a Client System. Such information resources can include advertisements, specifications, operation descriptions, product simulations, product upgrade information, purchase information, maintenance information, warranty and servicing information, etc. In this mode, desired product or service information is obtained by simply entering the registered product's trademark(s) or servicemark(s) and/or associated company name into the dialogue box of the Internet browser or Internet application tool. An exemplary display screen produced from the IPSD Server might be as follows:

> "Simply enter the trademark used in connection with the particular product and/or the company name of the product's manufacturer; click REQUEST, and then wait for the display of a list of Web locators (URLs) at which desired types of product information can be found on the Internet."

In response to such data entry operations, a list of URLs organized according to the information subfield classifications set forth in FIG. 2A2 are displayed on Client System placing the request. Upon selecting a particular URL from the displayed list thereof, video and audio information content are automatically displayed on the Client System from the IPSI Server hosting the selected URL.

In an alternative embodiment of the present invention, the "IPSI Finder Mode" and the "UPSN Search Mode" can be integrated into a single server application so that there is no need or desire to manually select IPSI Finder and UPSN Search Mode buttons. In such an embodiment, the interaction between the IPSD Server and the requesting Client System can be designed to support the following Web server display screens and script underlying the same:

> "Welcome to UPC-REQUEST™, the only Universal Product Information Finding System on the Internet.
>
> Have you purchased a particular product, or considering the purchase of a particular product, on which you would like current, up-to-date information from the manufacturer or advertiser?
>
> Look no further than the UPC-REQUEST™ Universal Product Information Finding System."
>
> "Simply enter the 12 digit UPC number of the particular product, click REQUEST, and await from the list of Web locators (URLs) selected by the manufacturer at which the desired product information can be found?
>
> "If you do not know the UPC number associated with the product you are looking for, then simply enter the trademark used in connection with the particular product and/or the company name of the manufacturer, Then click REQUEST, and wait for the display of the list of Web locators (URLs) at which the desired product information can be found?
>
> "Please select the URL from the displayed URL list by clicking on it. This will connect you to the product information related to the selected URL. You can return to the URL display list at anytime."

Notably, such an integrated Web server application can be realized in a variety of ways. The exact words and graphics used to create an interactive script for an integrated Web server application will vary from embodiment to embodiment.

The Automated Registration Solicitation Mode Of The System

In the illustrative embodiments of the present invention, the data-synchronized IPSD Servers of the system hereof are also provided with an "Automated Registration Solicitation Mode" programmed by the webmaster (or administrator) of the IPSI Web-site. In this mode, each IPSD Server analyzes the data collected within its Non-IPSI Registrant Database. The data analysis determines: (1) which "unregistered"

products or services in the Non-IPSI Registrant Database were the subject of an information request at the IPSD Server; (2) how many hits (requests) were made for the product or service within a predetermined length of time (e.g. one week) by Internet users; and (3) whether the number of requests exceeds a particular "request threshold" (e.g. 100 requests in week period). Then, for each unregistered product (or service) which has exceeded the request threshold, the IPSD Server automatically sends an e-mail message to the associated company. Preferably, the e-mail message is designed to (i) inform the company of recent information requests for their products and/or services, and (ii) solicit the registration of such products and/or services with the IPSD Server. Once registered with the system, such products and services can be easy found on the Internet by anyone wishing to use the product and service finding techniques of the present invention.

The present invention has been described in great detail with reference to the above illustrative embodiments. It is understood, however, that numerous modifications will readily occur to those with ordinary skill in the art having had the benefit of reading the present disclosure.

For example, in the illustrative embodiments described hereinabove, separate databases are maintained by each data-synchronized IPSD Server for (i) registered products and services within the system, and (ii) non-registered products and services within the system. Notably, the reasons for using a dual database design of this sort would be based largely on economics, namely: only those companies who have paid the required maintenance (or registration) fees get their products (or services) and linked URLs "registered" with the system, whereas non-paying companies do not get their products (or services) and linked URLs registered with the system, regardless of how such product-URL or service-URL information is ascertained (e.g. by solicitation versus data mining).

Thus it is contemplated that in some embodiments of the present invention, each IPSD Server will be designed to maintain only a single database for maintaining product-URL and service-URL information currently available on the Internet. In such embodiments of the present invention, the concept of "non-registered" products and services will be avoided altogether, since the system implementation and administration (in all likelihood) will be designed to not require companies to pay maintenance (or registration) fees in order that their products (or services) and linked URLs are registered with the IPSI system. Instead, some alternative income producing scheme will be used in such embodiments of the present invention (e.g., advertisement space, user fees, subscription fees, Internet browser-licensing fees, etc.) for system maintenance and administration.

When practicing the system and method of the present invention, it is preferred that the UPC label (with its human-readable UPC number) assigned to the particular product be attached, embossed or otherwise embodied on an accessible surface thereof. In addition to applying the UPC label to the external packaging of the product, it is preferred that the UPC label also be printed on any and all product instructions and manuals provided with the product. In this way, the UPC number can be easily read by a human being and then used to access a desired type of product information using the system and method of the present invention.

In order that the system hereof can be used to find information pertaining to large products such as automobiles, motorcycles, skidoos, farm machinery, boats, etc., the present invention also contemplates assigning UPC numbers to such products and attaching, embossing or otherwise embodying the same on an accessible surface thereof. Also, the UPC label should be printed on all instruction booklets and/or operating manuals normally provided with the product. In this way, information related to any particular product that is posted anywhere on the Internet and linked to URLs registered with the IPSD Servers of the system hereof can be readily found using the uniquely assigned UPC number assigned thereto by the manufacturer at the time of sale. Notably, multimedia information about such products can be most helpful in regard to the operation, repair and servicing of such products.

The system and method of the present invention has been shown to combine the use of UPC numbers, trademarks and company names when making a product information request of the system. It is understood, however, that the present invention can be practiced using any one of these items of information, alone or in combination with each other, in order to place a product (or service) information request with the system hereof.

These and all other such modifications and variations are deemed to be within the scope and spirit of the present invention as defined by the accompanying claims to Invention.

What is claimed is:

1. A system for finding and serving information pertaining to a particular consumer product and the manufacturer thereof on the Internet, said system comprising:

(1) an Internet database serving subsystem operably connected to the infrastructure of the Internet and including (1A) an information storage subsystem for storing first and second sets of information, said first set of information being representative of (i) a plurality of manufacturer identification numbers (MINs) assigned to a plurality of manufacturers of consumer products, each said MIN being assigned to one of said plurality of manufacturers of consumer products, and (ii) a plurality of home-page specifying URLs symbolically linked to said plurality of MINs, each said home-page specifying URL being symbolically linked to one of said plurality of manufacturers of consumer products and specifying the location of a manufacturer World Wide Web (WWW) site located on the Internet, having a home page on the WWW and being related to one of said plurality of manufacturers of consumer products, and said second set of information being representative of (i) a plurality of universal product numbers (UPN) assigned to a plurality of consumer products made by said plurality of manufacturers, each said UPN being assigned to one of said plurality of consumer products, and (ii) a plurality of product-information specifying URLs symbolically linked to said plurality of UPNs, each said product-information specifying URL including one of said plurality of MINs, and being symbolically linked to one of said plurality of consumer products and specifying the location of an information resource located on the Internet related to at least one of said plurality of consumer products, and (1B) request servicing means for servicing a request for information about one of said plurality of products located on the Internet, made by a client subsystem operably connected to the Internet, wherein said request is transmitted to said Internet database serving subsystem for processing and includes information representative of the UPN assigned to said consumer product on which product-related information located on the Internet is being sought by a consumer using said client subsystem, wherein said request servicing means automatically compares the UPN included in said request against said plurality of MINs stored in said information storage subsystem, and (i) automatically returns to said client subsystem, the home-page specifying URL symbolically linked to the MIN contained within the UPN included in said request if, at the time said request was made, no product-information specifying URLs have been symbolically linked to the UPN included in said request, within said information storage subsystem, and (ii) automatically returns to said client subsystem, one or more of URLs symbolically linked to said UPN included in said request, if, at the time said request was made, one or more product-information specifying URLs have been symbolically linked to the UPN included in said request, within said information storage subsystem; and (2) a plurality of product-information containing servers, each said product-information containing server being connected to the Internet and storing product-related information resources related to at least one of (i) one or more of the WWW sites of said plurality of manufacturers of consumer products, and (ii) one or more of said plurality of consumer products, wherein the location of each said product-related information resource on the Internet is specified by one said plurality of product-information specifying URLs, and wherein the location of the home page of each said WWW site is specified by one of said plurality of home-page specifying URLs, and wherein said client subsystem can use (i) the one or more product-information specifying URLs returned by said request servicing means to access product-related information from said one or more of said plurality of product-related information containing servers, and (ii) the home-page specifying URL returned from said request servicing means to access the home-page of the manufacturer's WWW site from one or more of said plurality of product-related information containing servers.

2. The system according to claim 1, wherein said one or more URLs are arranged for display on said client subsystem in accordance with a predetermined product-related information classification scheme.

3. The system according to claim 1, wherein one or more of said product-related information resources comprise HTML-encoded documents located on the WWW.

4. The system according to claim 3, wherein one or more of said product-information specifying URLs specify the location of said HTML-encoded documents located on the WWW.

5. The system according to claim 1, wherein said client subsystem is a WWW-enabled computer system selected from the group consisting of: a computer-based kiosk provided with a first WWW browser and a first bar code symbol reading device operably connected to said first WWW browser; a portable computer provided with a second WWW browser and a second bar code symbol reading device operably connected to said second WWW browser; and a desktop computer system provided with a third WWW browser and a third bar code symbol reading device operably connected to said third WWW browser.

6. The system according to claim 1, wherein said UPN is a UPC.

7. The system of claim 1, wherein said Internet database serving subsystem comprises an Internet information server and a relational database subsystem operably connected to said Internet database serving subsystem.

8. A method of finding and serving information pertaining to a particular consumer product and the manufacturer thereof on the Internet, said method comprising the steps of:

(a) storing first and second sets of information in an Internet database serving subsystem operably connected to the infrastructure of the Internet, said first set of information being representative of (i) a plurality of manufacturer identification numbers (MINs) assigned to a plurality of manufacturers of consumer products, each said MIN being assigned to one of said plurality of manufacturers of consumer products, and (ii) a plurality of home-page specifying URLs symbolically linked to said plurality of MINs, each said home-page specifying URL being symbolically linked to one of said plurality of manufacturers of consumer products and specifying the location of a manufacturer World Wide Web (WWW) site located on the Internet, having a home page on the WWW and being related to one of said plurality of manufacturers of consumer products, and said second set of information being representative of (i) a plurality of universal product numbers (UPN) assigned to a plurality of consumer products made by said plurality of manufacturers, each said UPN being assigned to one of said plurality of consumer products, and (ii) a plurality of product-information specifying URLs symbolically linked to said plurality of UPNs, each said product-information specifying URL including one of said plurality of MINs, and being symbolically linked to one of said plurality of consumer products, and specifying the location of an information resource located on the Internet related to at least one of said plurality of consumer products; and (b) transmitting to said Internet database serving subsystem, a request made by a client subsystem operably connected to the Internet, for product-related information on the Internet about one of said plurality of consumer products, said request including information representative of the UPN assigned to a particular consumer product on which product-related information located on the Internet is being sought by a consumer using said client subsystem, (c) said Internet database serving subsystem receiving said request and automatically comparing the UPN included in said request against said plurality of MINs stored in said information storage subsystem, and (i) automatically returning to said client subsystem, the home-page specifying URL symbolically linked to the MIN contained within the UPN included in said request, if, at the time said request is made, no product-information specifying URLs have been symbolically linked to the UPN included in said request, within said information storage subsystem, and (ii) automatically returning to said client subsystem, one or more of URLs symbolically linked to said UPN included in said request, if, at the time said request is made, one or more product-information specifying URLs have been symbolically linked to the UPN included in said request, within said information storage subsystem; and (d) said client subsystem using one or more URLs returned during step (c) to access product-related information resources and the home-page of manufacturer WWW sites from one or more product-related information containing servers, wherein each said product-related information containing server is connected to the Internet and stores product-related information resources related to at least one of (i) one or more of the WWW sites of said manufacturers of consumer products, and (ii) one or more of said plurality of consumer products, wherein the location of each said consumer product-related information resource on the Internet is specified by one said product-information specifying URL, and wherein the location of the home-page of each said WWW site is specified by one of said plurality of home-page specifying URLs.

9. The method according to claim 8, wherein said one or more product-information specifying URLs are arranged for display on said client subsystem in accordance with a predetermined product-related information classification scheme.

10. The method according to claim 8, wherein one or more of said product-related information resources comprise HTML-encoded documents on the WWW, and wherein one or more of said product-information specifying URLs specify the location of said HTML-encoded documents.

11. The method according to claim 8, wherein said client subsystem is a WWW-enabled computer system selected from the group consisting of: a computer-based kiosk provided with a first WWW browser and a first bar code symbol reading device operably connected to said first WWW browser; a portable computer provided with a second WWW browser and a second bar code symbol reading device operably connected to said second WWW browser; and a desktop computer system provided with a third WWW browser and a third bar code symbol reading device operably connected to said third WWW browser.

12. The method according to claim 8, wherein said UPN is a UPC.

13. The method of claim 8, wherein said Internet database serving subsystem comprises an Internet information server and a relational database subsystem operably connected to said Internet information server.

14. A system for finding and serving the home-page of a World Wide Web (WWW) site of a manufacturer of a particular consumer product, said system comprising:

(1) an Internet database serving subsystem operably connected to the infrastructure of the Internet and including (1A) an information storage subsystem for storing a set of information being representative of (i) a plurality of manufacturer identification numbers (MINs) assigned to a plurality of manufacturers of consumer products, each said MIN being assigned to one of said plurality of manufacturers of consumer products, and (ii) a plurality of home-page specifying URLs symbolically linked to said plurality of MINs, each said home-page specifying URL being symbolically linked to one of said plurality of manufacturers of consumer products and specifying the location of a manufacturer WWW site located on the Internet, having a home page on the WWW and being related to one of said plurality of manufacturers of consumer products, and (1B) request servicing means for servicing a request made by a client subsystem operably connected to the Internet, wherein said request is transmitted to said Internet database serving subsystem for processing and includes information representative of the UPN assigned to said consumer product on which product-related information located on the Internet is being sought by a consumer using said client subsystem, wherein said request servicing means automatically compares the UPN included in said request against said plurality of MINs stored in said information storage subsystem, and automatically returns to said client subsystem, the home-page specifying URL symbolically linked to the MIN contained within the UPN included in said request;

(2) a plurality of product-information containing servers, each said product-information containing server being connected to the Internet and storing information resources including the home-page of at least one or more of the WWW sites of said plurality of manufacturers of consumer products, wherein the location of the home-page of each said WWW site is specified by one of said plurality of home-page specifying URLs, and wherein said client subsystem can use the home-page specifying URL returned by said request servicing means to access from at least one of said product-information containing servers, the home-page of the WWW site of the manufacturer symbolically linked to said MIN contained within the UPN included in said request.

15. The system according to claim 14, wherein said home-page specifying URL returned by said request servicing means is automatically displayed on said client subsystem for accessing the home-page of the WWW site of the manufacturer symbolically linked to said MIN contained within the UPN included in said request.

16. The system according to claim 14, wherein one or more of said product-related information resources comprise HTML-encoded documents located on the WWW.

17. The system according to claim 16, wherein one or more of said product-information specifying URLs specify the location of said HTML-encoded documents on the WWW.

18. The system according to claim 14, wherein said client subsystem is a WWW-enabled computer system selected from the group consisting of: a computer-based kiosk provided with a first WWW browser and a first bar code symbol reading device operably connected to said first WWW browser; a portable computer provided with a second WWW browser and a second bar code symbol reading device operably connected to said second WWW browser; and a desktop computer system provided with a third WWW browser and a third bar code symbol reading device operably connected to said third WWW browser.

19. The system according to claim 14, wherein said UPN is a UPC.

20. The system of claim 14, wherein said Internet database serving subsystem comprises an Internet information server and a relational database subsystem operably connected to said Internet database serving subsystem.

21. A method of finding and serving the home-page of the World Wide Web (WWW) site of a manufacturer of a particular consumer product, said method comprising the steps of:

(a) storing a set of information in an Internet database serving subsystem operably connected to the infrastructure of the Internet, said set of information being representative of
  (i) a plurality of manufacturer identification numbers (MINs) assigned to a plurality of manufacturers of consumer products, each said MIN being assigned to one of said plurality of manufacturers of consumer products, and
  (ii) a plurality of home-page specifying URLs symbolically linked to said plurality of MINs, each said home-page specifying URL being symbolically linked to one of said plurality of manufacturers of consumer products and specifying the location of a manufacturer World Wide Web (WWW) site located on the Internet, having a home page, and being related to one of said plurality of manufacturers of consumer products;

(b) transmitting to said Internet database serving subsystem, a request made by a client subsystem operably connected to the Internet, for product-related information on the Internet about one of said plurality of consumer products, said request including information representative of the UPN assigned to a particular consumer product on which product-related information located on the Internet is being sought by a consumer using said client subsystem;

(c) said Internet database serving subsystem receiving said request and automatically comparing the UPN included in said request against said plurality of MINs stored in said information storage subsystem, and automatically returning to said client subsystem, the home-page specifying URL symbolically linked to the MIN contained within the UPN included in said request; and (d) said client subsystem using the home-page specifying URL returned during step (c) to access the home-page of the WWW site of the manufacturer symbolically linked to the MIN contained within the UPN included in said request.

22. The method according to claim 21, wherein said home-page specifying URL returned during step (c) is automatically displayed on said client subsystem for accessing the home-page of the WWW site of the manufacturer symbolically linked to said MIN contained within the UPN included in said request.

23. The method according to claim 21, wherein one or more of the home-pages of said WWW sites comprise HTML-encoded documents located on the WWW.

24. The method according to claim 23, wherein one or more of said home-page specifying URLs specify the location of said HTML-encoded documents on the WWW.

25. The method according to claim 21, wherein said client subsystem is a WWW-enabled computer system selected from the group consisting of: a computer-based kiosk provided with a first WWW browser and a first bar code symbol reading device operably connected to said first WWW browser; a portable computer provided with a second WWW browser and a second bar code symbol reading device operably connected to said second WWW browser; and a desktop computer system provided with a third WWW browser and a third bar code symbol reading device operably connected to said third WWW browser.

26. The method according to claim 21, wherein said UPN is a UPC.

27. The method of claim 21, wherein said Internet database serving subsystem comprises an Internet information server and a relational database subsystem operably connected to said Internet database serving subsystem.

* * * * *